May 29, 1934.  L. M. TODD ET AL  1,960,560
PRINTING APPARATUS
Filed Oct. 18, 1930   10 Sheets-Sheet 10
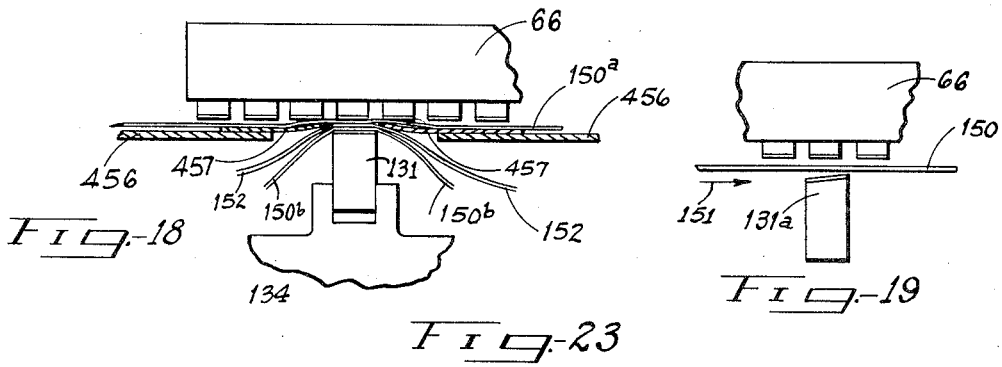
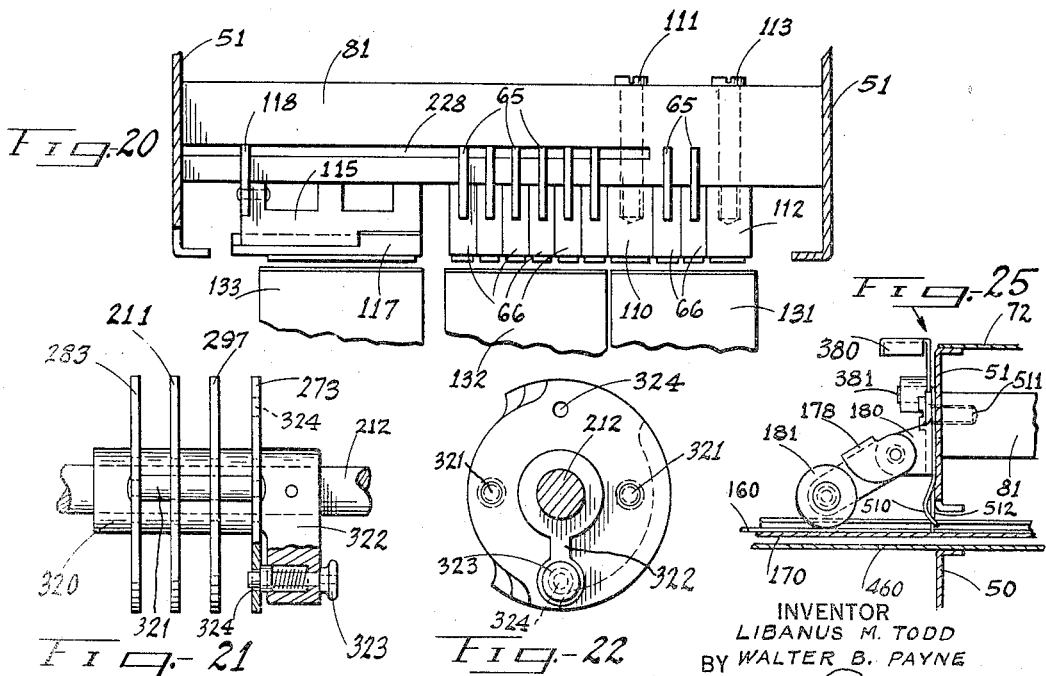

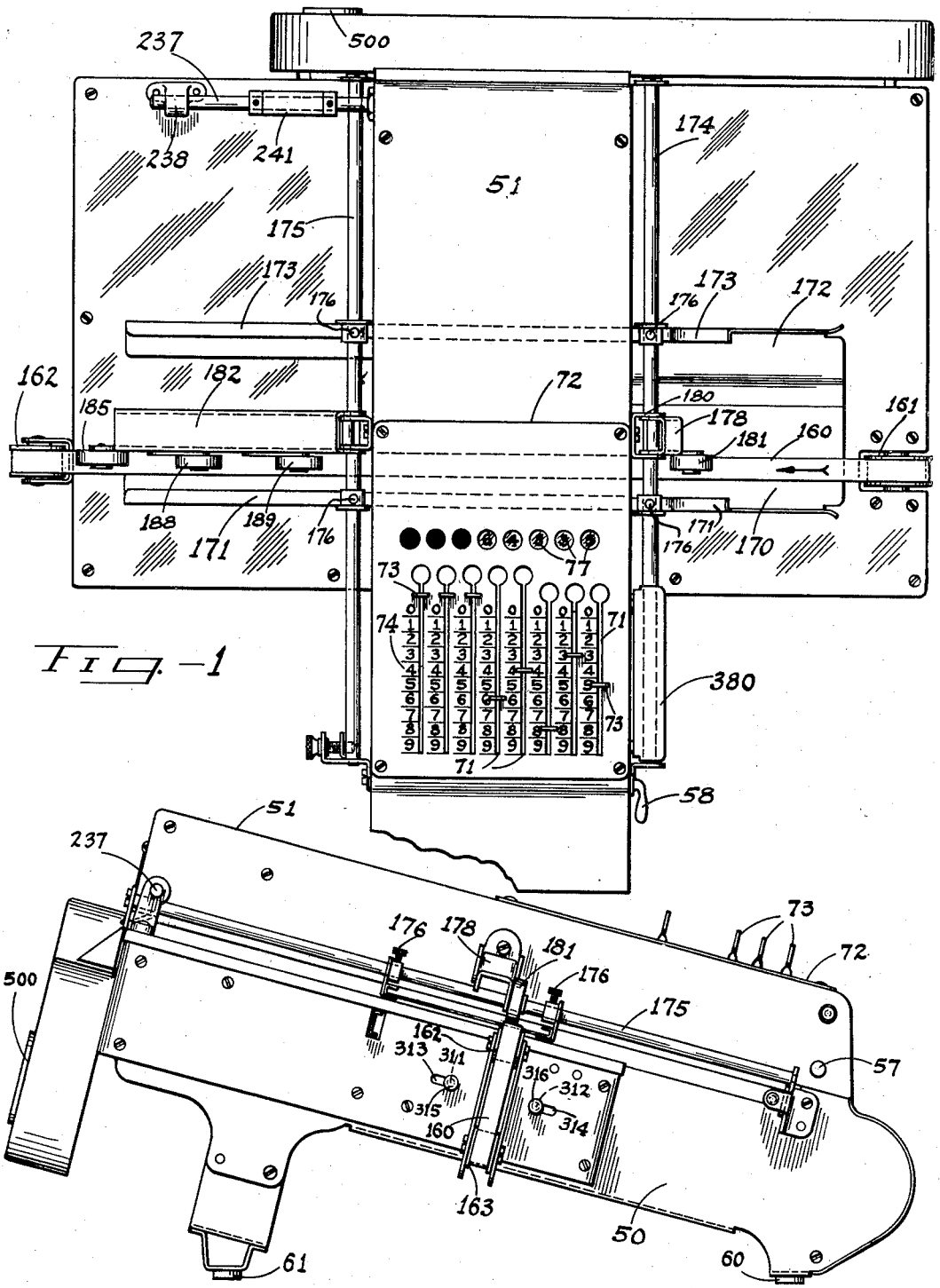

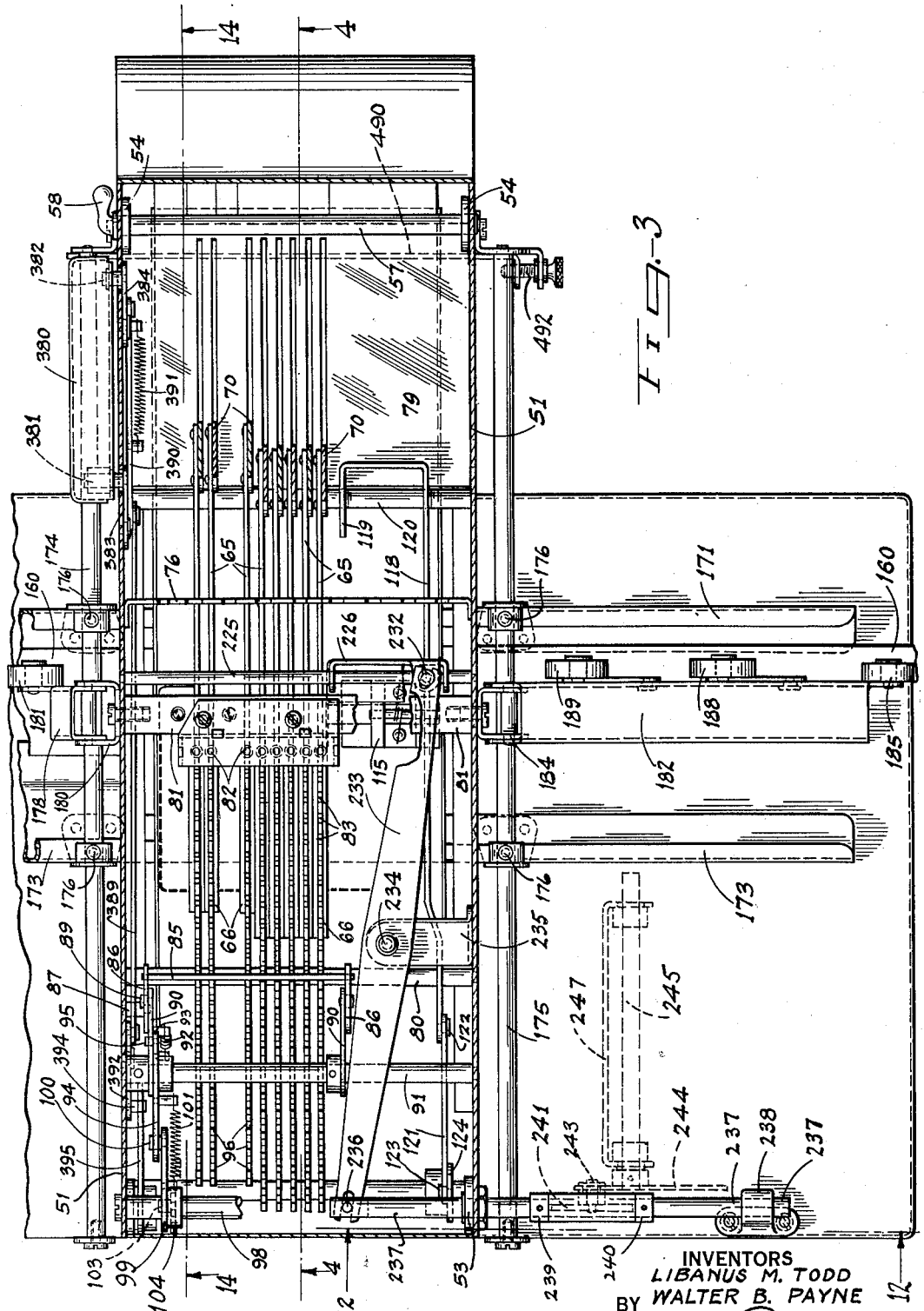

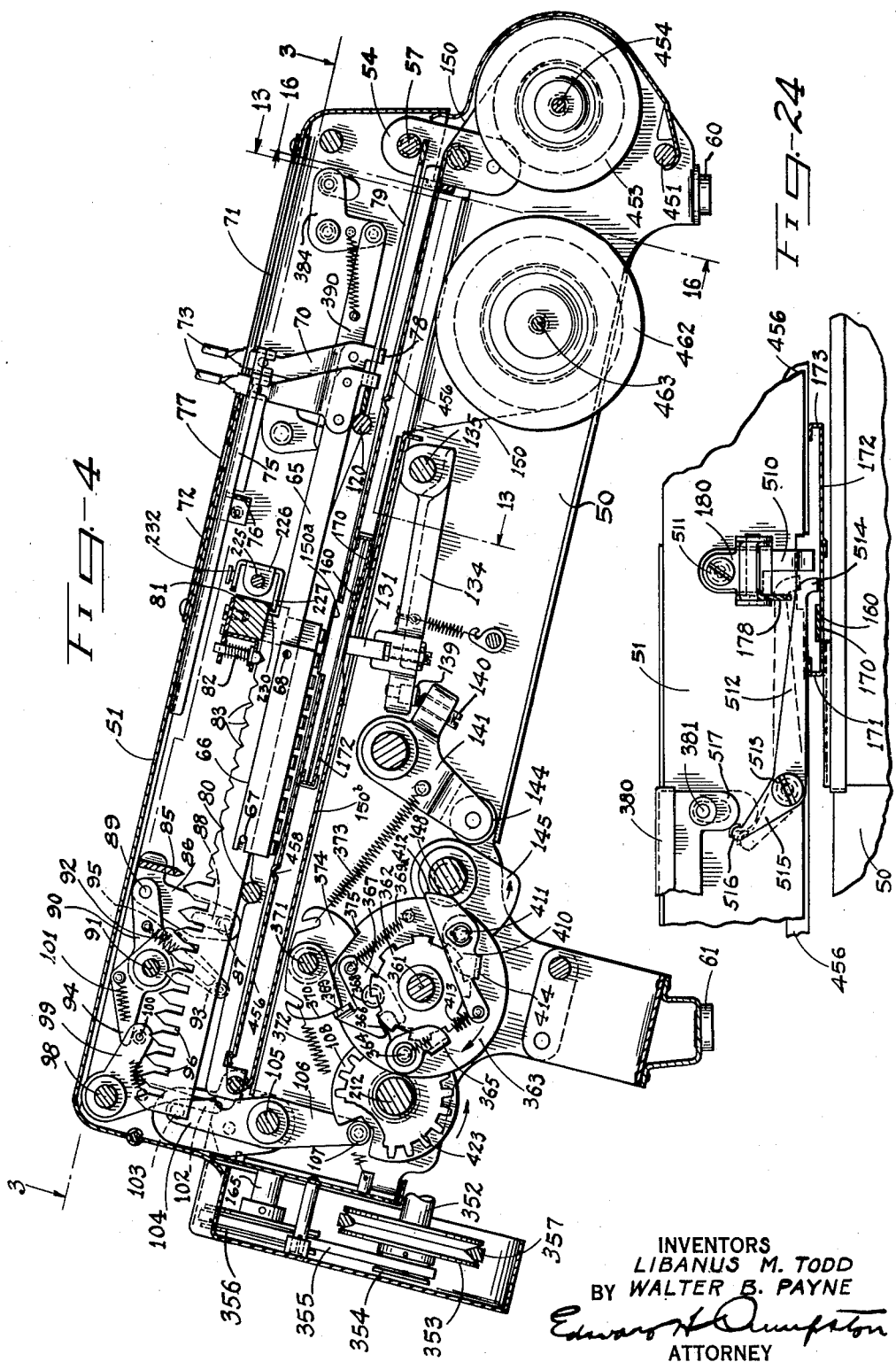

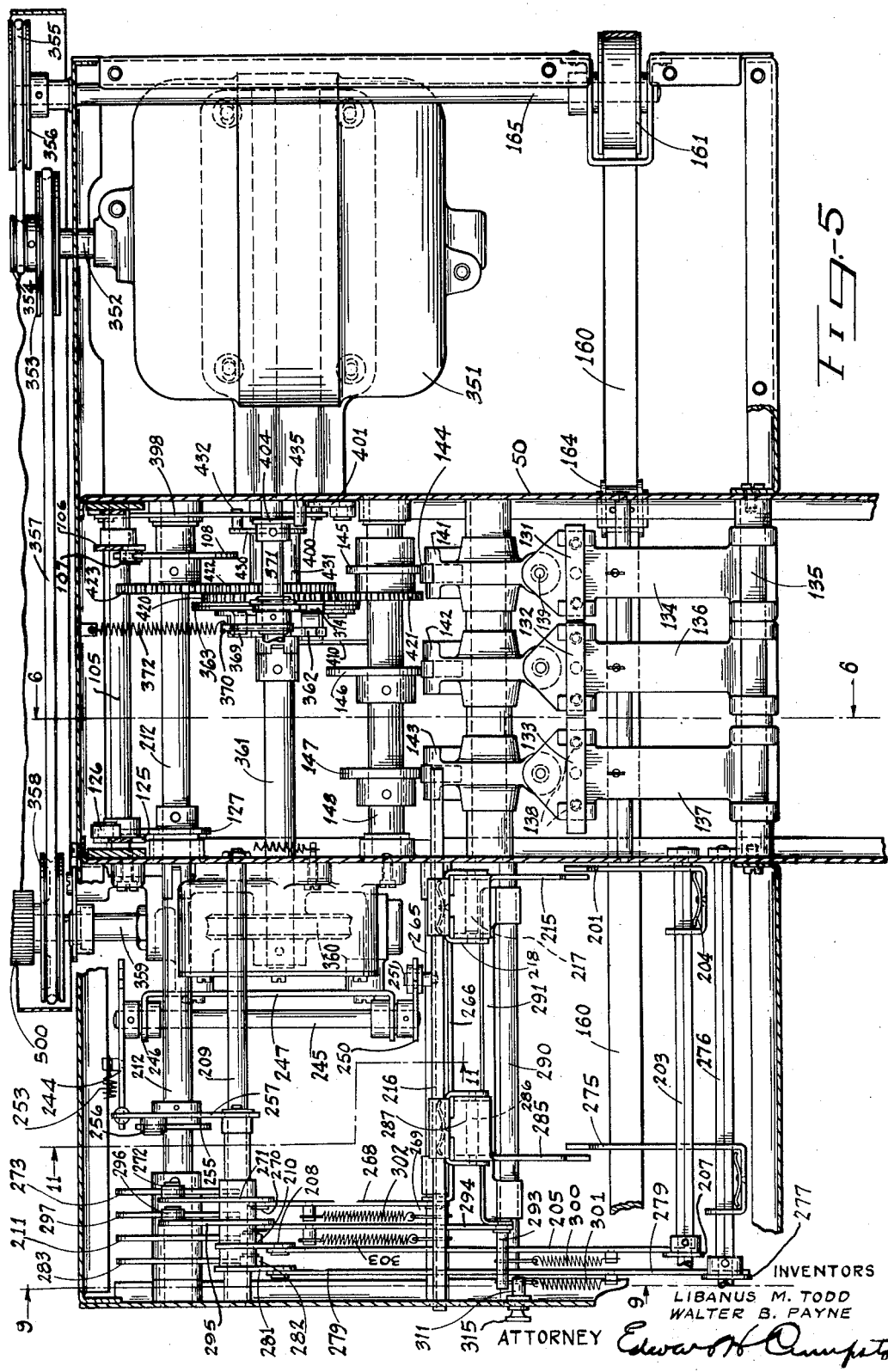

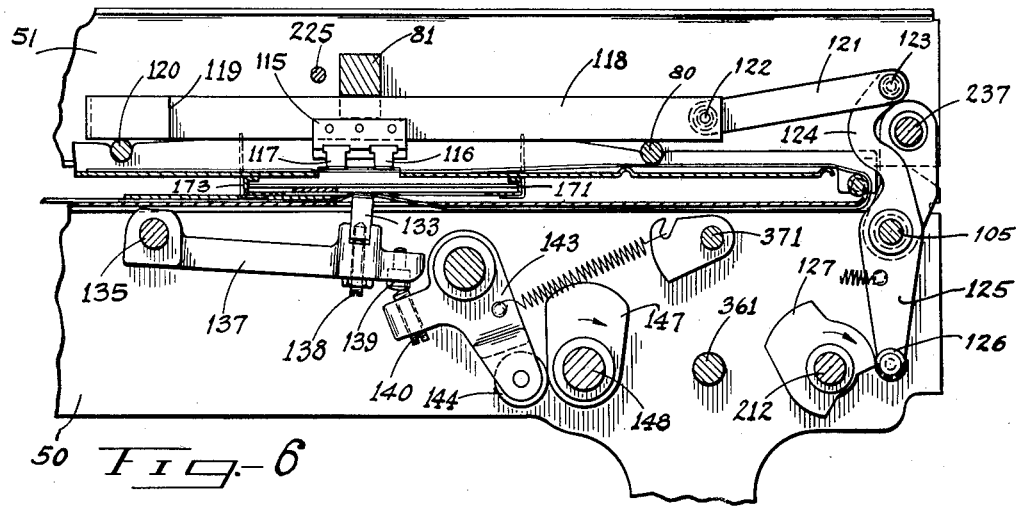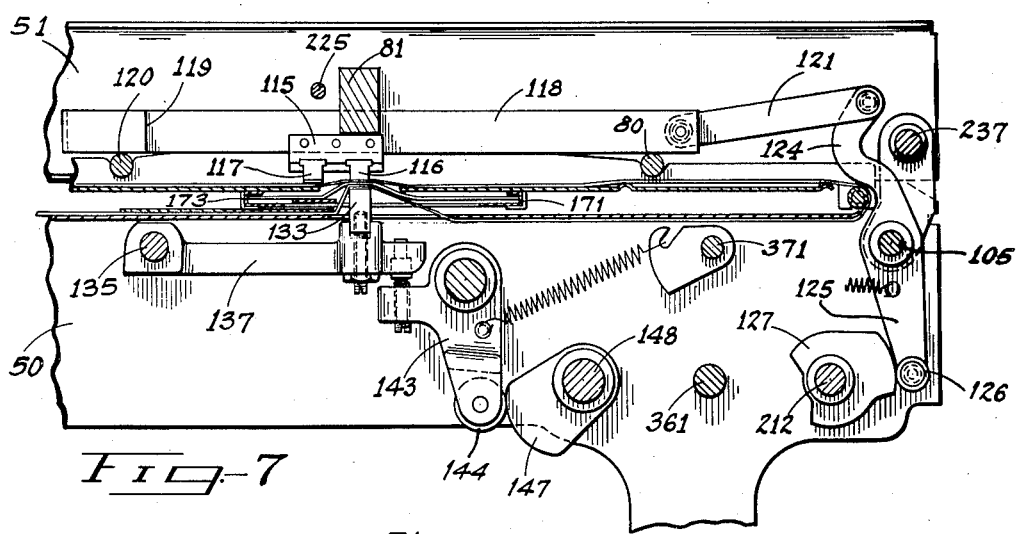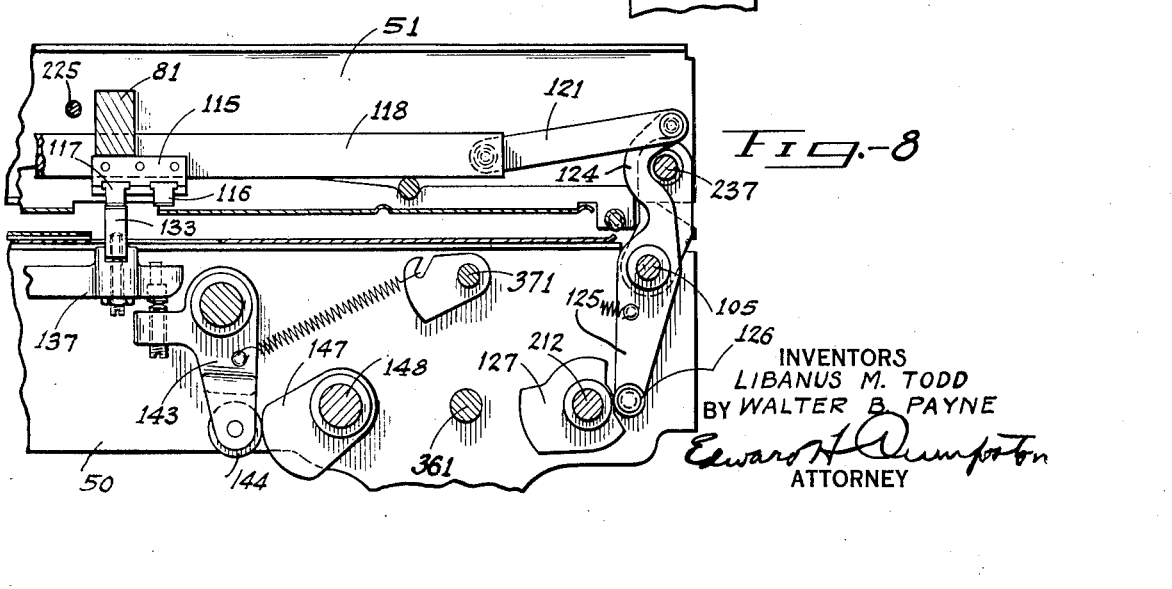

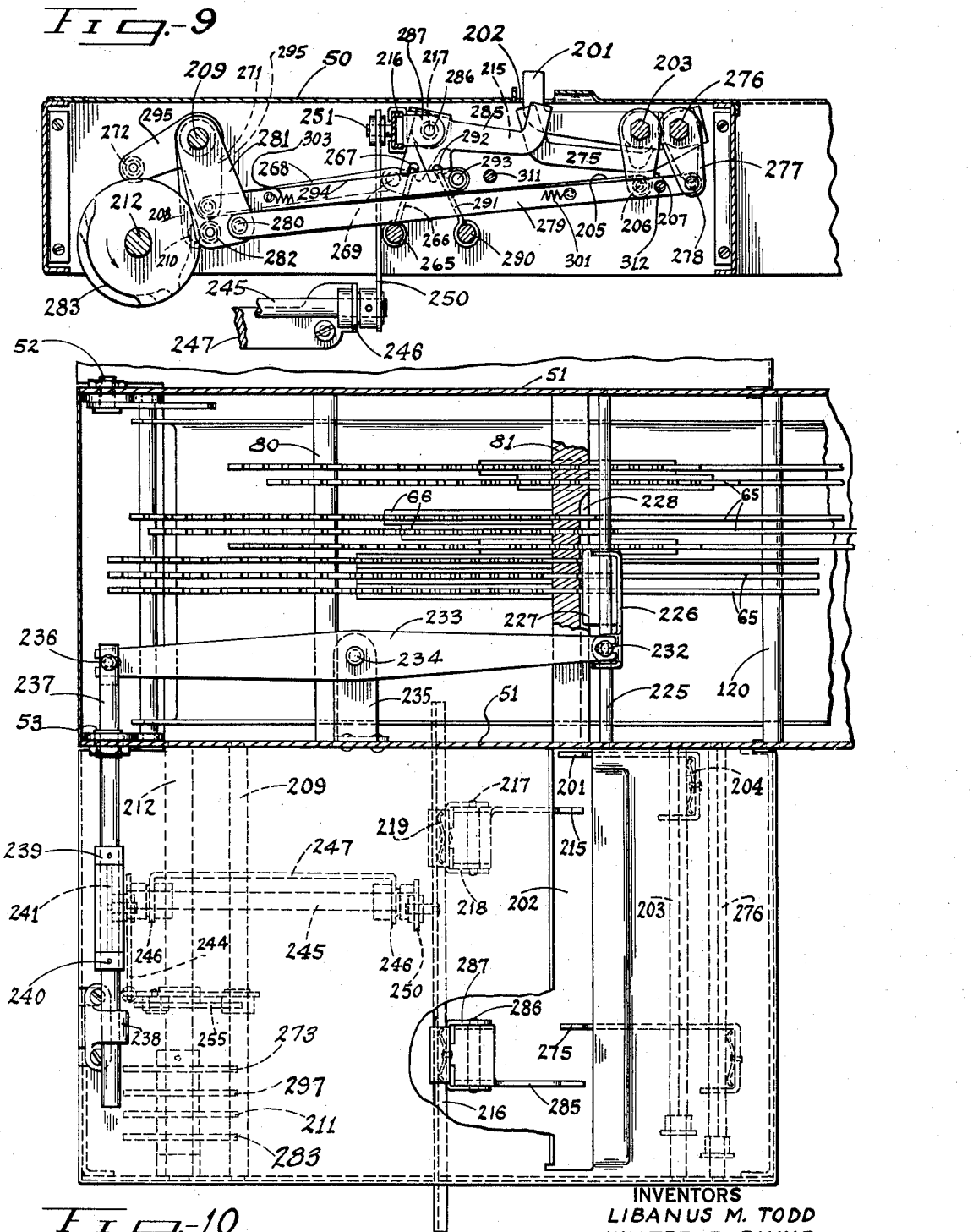

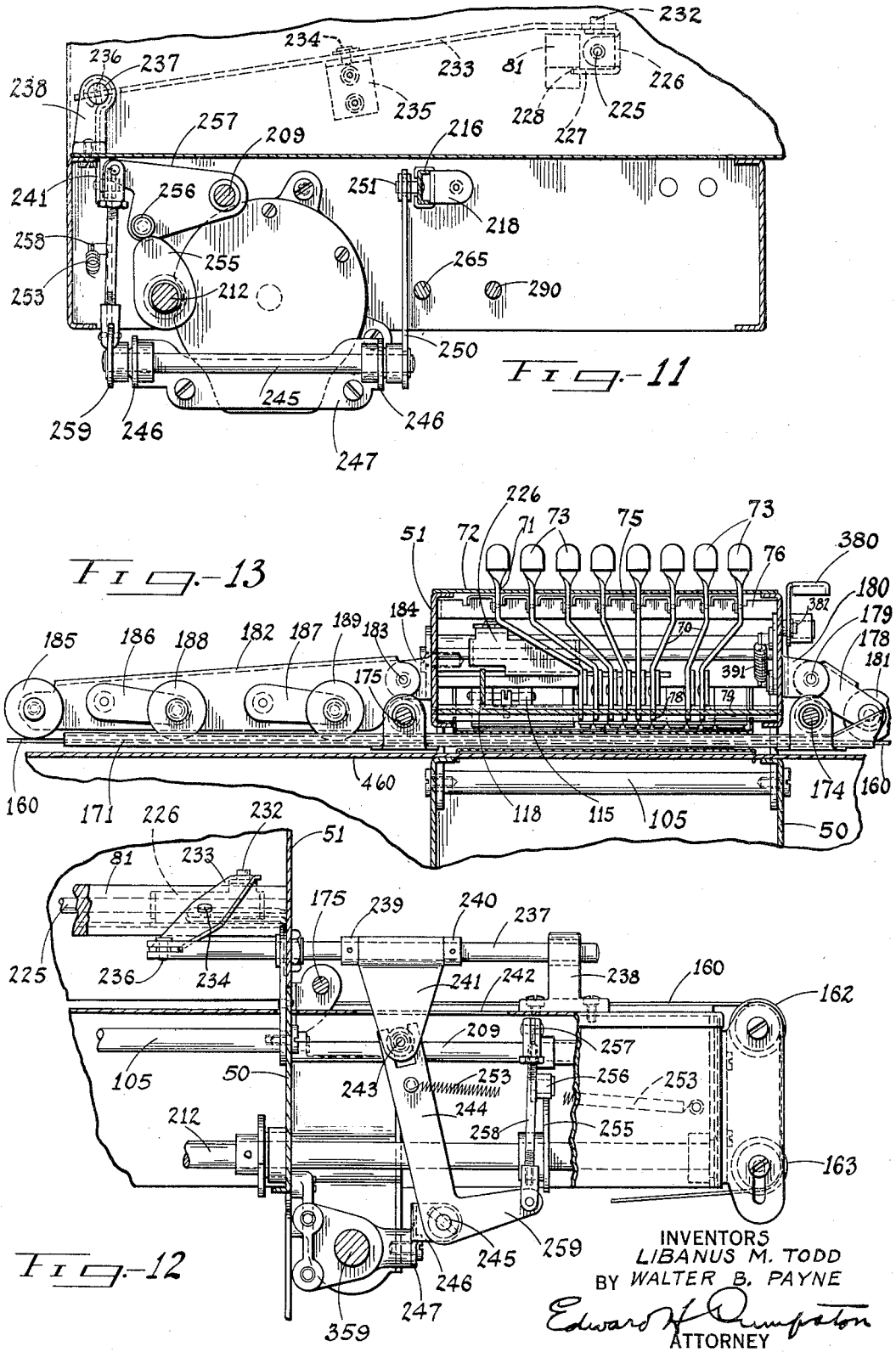

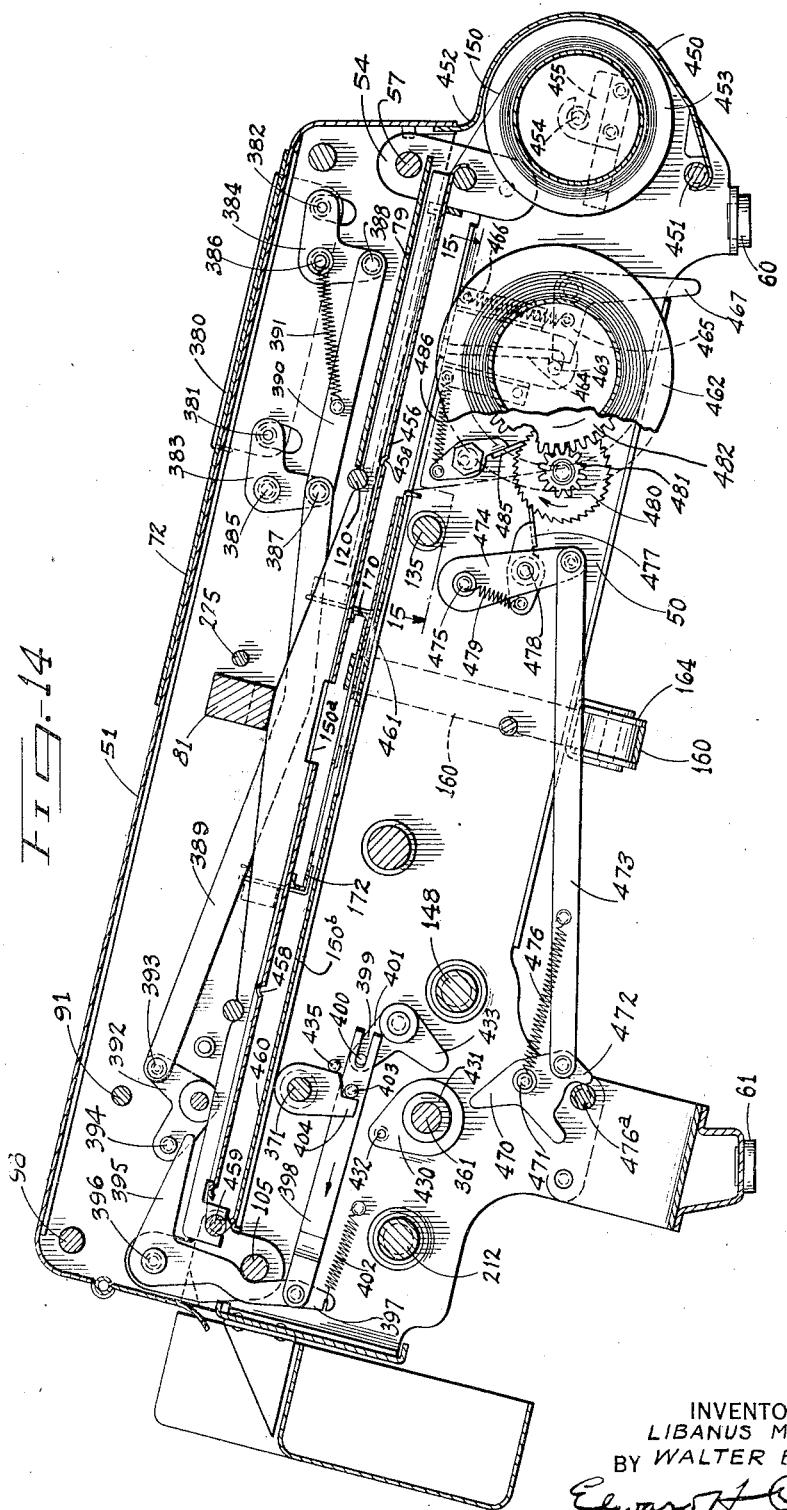

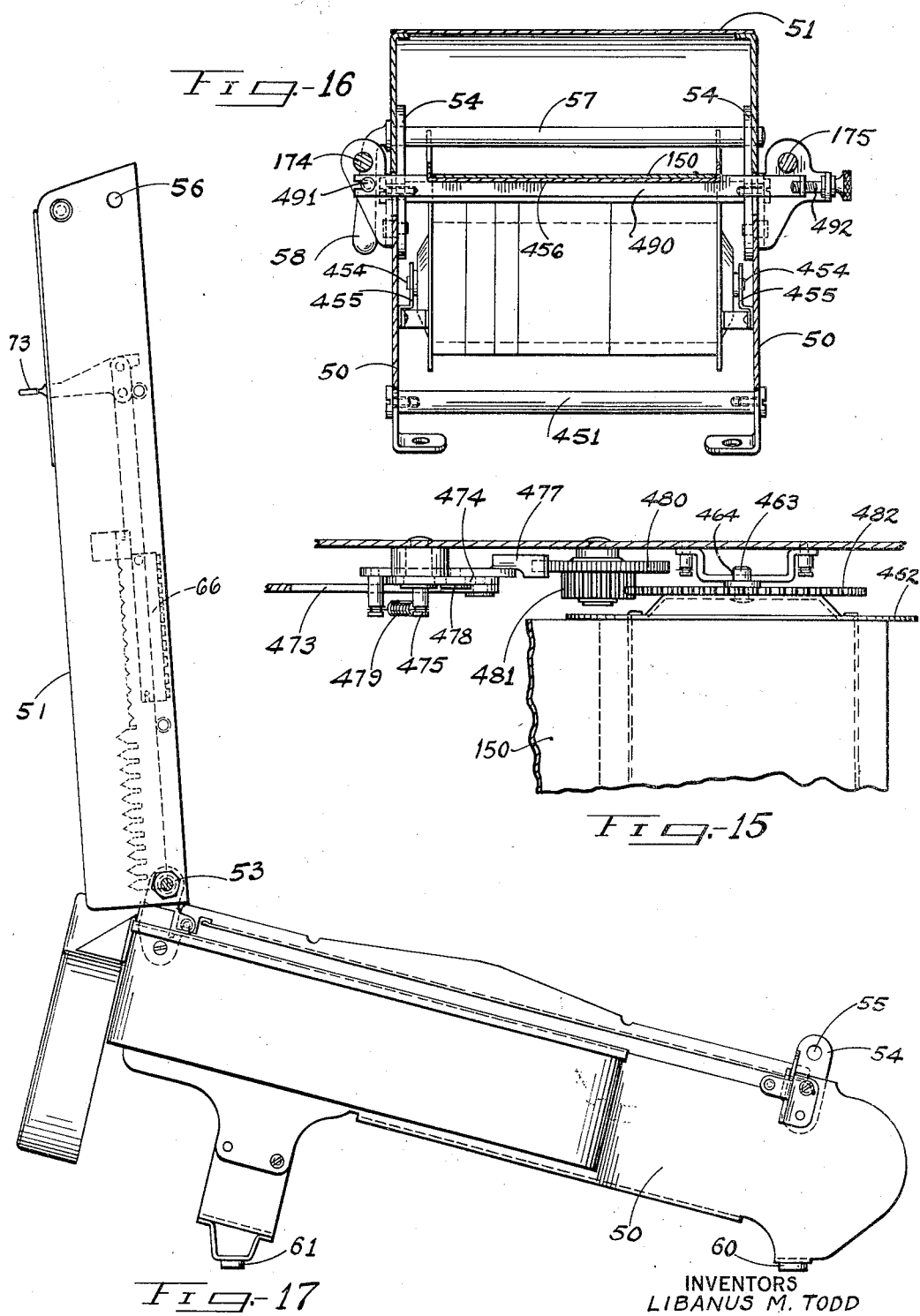

Patented May 29, 1934

1,960,560

UNITED STATES PATENT OFFICE 1,960,560

PRINTING APPARATUS

Libanus M. Todd and Walter B. Payne, Rochester N. Y., assignors to The Todd Company, Inc., Rochester, N. Y., a corporation of New York Application October 18, 1930, Serial No. 489,618

49 Claims. (Cl. 101—97)

This invention relates to a printing apparatus intended primarily for printing checks, drafts, and similar instruments, although it may be employed also for printing various other articles such, for example, as bills or statements, and many features of the invention are applicable to the field of printing apparatus in general.

An object of the invention is the provision of simple, generally improved, and more satisfactory apparatus of the kind above mentioned.

A further object of the invention is the provision of apparatus of an automatic character which will operate to print one or more times as desired without further attention from the operator after he has set the mechanism to print the desired amount, has delivered a sheet to the feeding mechanism, and has actuated a trip or other member which starts the operation.

Still another object is the provision of a simple and satisfactory apparatus which is extremely rapid in operation, and which will turn out finished work at a relatively high rate of speed and with a minimum of effort on the part of the operator.

A further object is the provision of apparatus for printing matter of variable length, such as an amount, in conjunction with other matter, such as a prefix, which apparatus is so arranged that the other matter will always be printed in predetermined relationship to the matter of variable length notwithstanding the variations in the length of the latter, the prefix preferably being printed in a different color from the adjacent portion of the amount.

A still further object is the provision of printing apparatus for printing the same matter in two different positions upon a sheet, and of such apparatus so arranged that it may be quickly and easily set to omit printing the matter in either one of the positions and to print it only in the other position.

A still further object is the provision of a novel method of printing checks and the like.

To these and other ends the invention resides in certain improvements and combinations of parts, all as will be hereinafter more fully described, the novel features being pointed out in the claims at the end of the specification.

In the drawings:

Fig. 1 is a plan view of apparatus constructed in accordance with a preferred embodiment of the invention;

Fig. 2 is an end elevation of the same;

Fig. 3 is a fragmentary section through a portion of the apparatus, taken approximately horizontally and substantially on the line 3—3 of Fig. 4;

Fig. 4 is a vertical section substantially on the line 4—4 of Fig. 3;

Fig. 5 is a horizontal section taken just beneath the top of the lower casing, illustrating various parts of the operating mechanism;

Fig. 6 is a fragmentary vertical section substantially on the line 6—6 of Fig. 5, illustrating the operating mechanism for the prefix printing platen in its normal position of rest;

Fig. 7 is a similar view showing the first prefix type in printing position and the platen raised to print the first prefix;

Fig. 8 is a similar view showing the second prefix type in printing position and the platen raised to print the second prefix;

Fig. 9 is a vertical section substantially on the line 9—9 of Fig. 5, illustrating the paper stops;

Fig. 10 is a plan of a fragment of the apparatus with parts broken away and parts in section, illustrating the paper stops;

Fig. 11 is a vertical section substantially on the line 11—11 of Fig. 5, illustrating details of the stop positioning mechanism;

Fig. 12 is a vertical section substantially on the line 12—12 of Fig. 3, illustrating other details of the stop positioning mechanism;

Fig. 13 is a vertical section taken substantially on the line 13—13 of Fig. 4;

Fig. 14 is a vertical section taken substantially on the line 14—14 of Fig. 3, illustrating the clutch tripping mechanism and the ribbon feed mechanism;

Fig. 15 is a section substantially on the line 15—15 of Fig. 14, illustrating details of the ribbon feed mechanism;

Fig. 16 is a section taken substantially on the line 16—16 of Fig. 4, illustrating the retaining means for holding one section of the casing in cooperative relation to the other section thereof;

Fig. 17 is an end elevation of the apparatus somewhat similar to Fig. 2, but showing the upper casing section swung upwardly and backwardly to open up the apparatus;

Fig. 18 is a detail view showing the relation of the type, platen, ribbon, and sheet when the ribbon is arranged both above and below the sheet so as to print on both sides thereof;

Fig. 19 is a detail view showing the relationship between the printing type and a platen so formed relative to each other as to compensate for use of the ribbon;

Fig. 20 is an elevation with parts in section of the type members and printing platens;

Fig. 21 is a side view with parts in section of the cam assembly for controlling the paper stops;

Fig. 22 is an end view of the same;

Fig. 23 is a view of a check printed by the apparatus of this invention;

Fig. 24 (Sheet 3) is an elevation with parts in section, illustrating a supplemental stop mechanism used in a modified form of the apparatus, and Fig. 25 (Sheet 10) is a vertical section with parts in elevation of the construction shown in Fig. 24.

Similar reference numerals throughout the several views indicate the same parts.

General outline

Apparatus constructed in accordance with a preferred embodiment of the invention comprises printing types selectively settable to print any desired amount of various numbers of digits, and a printing type for printing a prefix, in conjunction with feeding mechanism for feeding a sheet of paper to printing position. The feeding mechanism in the preferred embodiment, comprises a continuously moving belt on which the paper rests, rollers pressing upon the top of the paper serving to hold it in sufficient contact with the belt so that the belt constantly tends to move the paper although the paper may be held in stationary position by contact with the stop.

One stop is provided for holding the paper stationary while the amount is printed thereon by the selectively settable type members, and this stop is then automatically withdrawn so that the paper moves under the influence of the feeding belt until it comes into contact with a second stop which holds it in stationary position while the prefix is being printed thereon. It is desired at all times to print the prefix relatively closely to the beginning of the amount, in order to prevent raising of the amount by the insertion of additional words or figures between the prefix and the beginning of the amount. Since the amount may vary considerably as to length, one of the paper stops which holds the paper in position for one of the printing operations is shiftable under the control of the amount printing means and in accordance with the length of the amount printed thereby. Hence this shiftable paper stop will stop the paper and hold it in printing position at various different points relative to the printing type, depending on the length of the amount printed. In this way, the prefix is always printed in predetermined relationship to the amount, irrespective of variations in the length of the latter.

The preferred apparatus also has provision for printing the same amount twice upon the same sheet. The second printing, as well as the first, embodies a prefix, and one of the two stops which cooperate with the paper during the second printing is shiftable like one of the stops which operate during the first printing, so that the prefix in the second printing is always printed in predetermined relation to the amount irrespective of variations in the length of the latter.

Preferably also the prefix printed in connection with the second amount is different from the prefix printed in connection with the first amount. For example, one prefix may include the word "Exactly" or any other wording such as the name of the drawer of the check, together with the dollar sign, while the other prefix may include different wording together with the dollar sign or may consist simply of the dollar sign alone. In the preferred apparatus, two different printing types are used for the two different prefix characters, and first one of them and then the other of them is automatically moved into printing position so that one is printed in connection with the first printed amount and the other prefix is printed in connection with the second printed amount. Preferably also both of the prefix character types are easily and quickly removable from the machine and replaceable by other types carrying different words and characters. The prefix is preferably printed in a different color from the adjacent portion of the amount, and to this end a ribbon having a plurality of different color zones is employed.

The apparatus is also provided with mechanism for varying the cycle of operation so that either one of the two printings on the same sheet may be easily omitted at will. Hence it is possible to print only one amount and one prefix on each check or other sheet if desired, and when such a single printing is desired, the printing may take place in either of the two possible positions.

The checks or other sheets are placed by the operator on the feeding belt either before or after the selectively settable types are set to print the desired amount. Then the operator presses a clutch tripping device to connect the machine with a driving motor, and the machine automatically prints the desired amount either once or twice upon the paper, as may have been predetermined by the setting of the mechanism, and then ejects the printed check into a suitable receptacle, or feeds it to another machine for further operations.

The various individual parts of the mechanism will be described below under appropriate headings for ease of reference.

Frame and casing

The parts of the mechanism are mounted on a frame which is divided into two portions hinged to each other so that they may be opened up to obtain easy access to various parts for purposes of cleaning or adjustment. Each of the frame portions is preferably formed by the casing itself, rather than by the use of special frame members within a casing, so as to eliminate the weight of special frame members. Hence the material of which the casing is made, preferably sheet metal, is sufficiently strong and rigid so that the various shafts and other parts may be mounted thereon.

Referring especially to Figs. 2, 4, and 17, the apparatus comprises a lower casing 50 forming the lower frame portion and an upper casing 51 forming the upper frame portion, pivotally connected to each other by means of a stud 52 (Fig. 10) near one rear corner of the upper casing and a sleeve 53 near the opposite rear corner of the upper casing. When the upper casing is in its closed or normal position shown in Figs. 2 and 4, there is a slight space between the two portions through which the paper or other sheet material is fed to and from printing position. When the retaining means is released, the upper casing portion 51 may be swung upwardly and rearwardly about the pivots 52 and 53 to the position illustrated in Fig. 17, which permits ready access to various parts of the mechanism.

The retaining means for holding the two casings or frame portions in normal operative position preferably comprise lugs 54 (Figs. 4 and 16)

fixed to the lower casing 50 and extending upwardly just within the side walls of the upper casing 51, near the forward end thereof. These lugs 54 have apertures 55 therein (Fig. 17) in alinement with each other and in alinement with apertures 56 in the upper casing. To lock the two portions together, a rod 57 (Fig. 16) may be inserted longitudinally through the registering apertures 55 and 56 so that the front ends of the two casings are held rigidly and firmly to each other. This locking rod 57 is preferably not perfectly straight, but is slightly cambered or bowed so that it has a slight cam action when it rotates. Thus the rod may be inserted in one position, for example with the handle 58 thereof extending in an upward direction, and when it has been moved longitudinally to its proper position the handle 58 may then be oscillated to a downward position such as shown in Fig. 16, during which oscillation the cam action of the bowed rod will be effective to pull the casing 51 very firmly downwardly relative to the lugs 54 and thus lock the parts securely together without any play. The camber of the rod 57 is so slight that it is not noticeable in Fig. 16, but even such a slight camber is found in practice to be sufficient to produce the desired firm locking of the parts. The described connection of the upper and lower frame portions with each other at opposite sides of the machine affords a strong and rigid construction for resisting the stresses required for printing which are greater where, as here, the paper is macerated by the type and platen to increase the impregnation of the paper with the ink.

The lower casing 50 is provided with suitable feet 60 and 61 so that it may rest upon a table or other surface, the feet preferably being so arranged that the casing slopes downwardly and forwardly when in its normal position, as shown in Figs. 2 and 4.

*Printing types*

Printing types, in the present preferred embodiment, are arranged within the upper casing 51. They comprise a series of selectively settable printing or type members 65 (Figs. 3, 4, and 20) slidable longitudinally and each carrying a type element 66 of generally U-shaped cross section fitting around the lower edge of the member 65 on which it is mounted and being secured thereto by means of a pin 67 on each member 65 engaging a slot at one end of the associated type element 66, and a screw 68 connecting the type member to the type element at the other end of the latter. These type elements 66 are formed with printing types for printing any desired matter, preferably numerals from zero to nine inclusive. As many of these type members and type elements may be provided as desired, depending upon the desired capacity of the machine. In the present instance, as shown in Figs. 3 and 20, six members are provided for printing dollars, and two other members somewhat spaced from the six for printing cents. Hence the limiting capacity of the machine illustrated is the amount of one million dollars. These printing members may be termed denominational members, since they are arranged according to denominations, one member representing units of dollars, another tens of dollars, another hundreds of dollars, etc.

The printing members are moved selectively to any desired position by means of arms 70 extending upwardly through slots 71 (Fig. 1) in a cover plate 72 which overlies the top plate of the upper casing 51, and terminating in finger pieces 73 which may be conveniently grasped by the operator to shift the printing members. As shown in Fig. 13, the arms 70 diverge as they extend upwardly so that finger pieces 73 are arranged further apart than the comparatively close spacing of the printing members 65 and thus are more conveniently operated.

Numerals 74 (Fig. 1) are placed alongside of the slots 71 to indicate the positions to which each finger piece should be shifted to set its associated printing member to print any desired number. As a further aid to the operator in setting up the number, each arm 70 has associated therewith a slide 75 (Figs. 4 and 13) supported in position just beneath the top plate of the casing 51 by a cross bar 76. This slide 75 has a flat upper surface carrying numerals which are visible through sight openings 77 in the top plate 72.

Certain of the denominational members are always set to print one number or another. Preferably these are the units of dollars and the units of tens of cents members, as it is desired at all times to print a zero in these denominations if no other numeral is to be printed. Hence the motion of the finger pieces associated with the units of dollars and units and tens of cents denominational members is limited so that they cannot be moved past the zero position in one direction or past the nine position in the other direction. In the case of the tens of dollars denominational member, however, and all higher denominations, it is possible to move each of these members rearwardly beyond the zero position to an ineffective non-printing position if desired, in which no numeral will be printed. The slides 75 connected to the denominational members of these higher denominations have portions on them which show a conspicuously contrasting color through the sight openings 77 when these members are moved to the ineffective non-print position. Preferably jet black portions are used for this purpose on the slides 75, as shown in Fig. 1. When any member is moved forwardly to the zero position or to any other printing position, the corresponding numeral shows through the sight opening 77 associated with this member, but when the member is in its non-printing position, the black area appearing through the sight opening 77 conspicuously calls the attention of the operator to the fact that this member is in non-printing position, so that he cannot readily overlook setting it in a printing position if such setting is desired.

This arrangement is of great advantage in preventing errors on the part of the operator. For example, if it is desired to print 101.00, the operator may move the hundreds of dollars finger piece to its 1 position and the units of dollars finger piece to its 1 position, but may overlook moving the tens of dollars finger piece from its ineffective non-print position to its zero position. However, when glancing at the sight openings to verify the amount preparatory to printing the check or other instrument, he would notice at once the conspicuous black area between the numeral 1 in the hundreds of dollars position and the numeral 1 in the units of dollars position, and this would remind him to set the tens of dollars member in its zero position.

The arms 70 have downwardly extending lugs 78 which extend through slots in a guide plate 79, as shown in Figs. 4 and 13. Thus the front ends of the denominational members are suitably guided for movement and held against lateral displacement, and their rear ends are supported by a shaft 80. The upper edges of the members 65 are also guided in slots in the lower edge of a relatively heavy bar 81 (Figs. 4 and 10) extending across the upper casing from side to side and serving as an abutment to resist the upward pressure on the printing members caused by the platen during a printing operation.

For centering the printing members properly in printing position, there is provided a spring plunger 82 (Fig. 4) for each denomination, mounted on the bar 81 and tending to move downwardly into notches 83 formed in the upper edge of each printing member 65 in position so that one notch is directly beneath the plunger whenever the printing member is properly set in any one of its positions. The interaction between the notches 83 and the plunger 82 enables the operator to tell by the sense of touch when the printing member is properly centered.

To insure proper alinement of the printing members during an actual printing operation, there is provided a centering or alining bar 85 mounted on arms 86 one of which is adjacent one side of the upper casing 51, as shown in Fig. 3. The casing 51 is provided adjacent the lower end of this arm 86 with a stud 87 extending into a slot 88 in the arm 86, so that the arm is guided for upward and downward movement on this stud. Each arm is pivotally connected adjacent its upper end at 89 to an arm 90 fixed to a shaft 91. One of the arms 90 is connected by a spring 92 to an arm 93 of a two armed lever, the other arm of which is indicated at 94. The stud 95 on the arm 93 acts as a stop for the lever 90 and limits the motion of the two arms relative to each other in one direction under the influence of the spring 92, but permits the two arms to move relative to each other in the opposite direction by stretching the spring. Thus a resilient connection is provided for operating the alinement bar 85, so that in case this bar should be unable to complete its full cycle of movement, the mechanism would not be broken.

Movement of the two armed lever 93, 94 in a clockwise direction when viewed as in Fig. 4 obviously results in depressing the centering bar 85, which is thus brought downwardly into one or another of the slots 96 formed in the upper edge of each member 65 and provided with sharp pointed teeth between the slots. Since the thickness of the alinement member 85 is only very slightly less than the width of each slot 96, it follows that downward movement of the bar 85 will accurately position the printing members 65 so that the numerals printed thereby will be in perfect alinement.

The two armed lever 93, 94 is operated in connection with each printing operation by means including a bell crank mounted on the shaft 98 near the rear edge of the upper casing 51. One arm 99 of this bell crank carries a stud 100 underlying the arm 94 of the two armed lever, so that when the bell crank is swung in a counter-clockwise direction the stud 100 will raise the arm 94 to move the latter in a clockwise direction. A spring 101 connects the bell crank to the arm 94 and keeps the latter in contact with the stud 100. The bell crank has a second arm or tail 102 extending in a downward direction in position to be actuated by a stud 103 on the upper arm 104 of a lever oscillating on a shaft 105 in the lower casing 50. The connection between the lever 104 and the bell crank on the shaft 98, being a simple contacting connection between the stud 103 and the arm 102, does not interfere in any way with the pivotal movement of the upper casing 51 relative to the lower casing 50 when the two casings are opened up relative to each other. The lever arm 104 has another arm 106 connected thereto which carries a follower roller 107 arranged to be actuated by the cam 108, to operate the alinement bar 85. The mechanism for moving the cam will be described below under the heading "Driving mechanism".

In addition to the denominational printing members which have been described, there are also other printing members. For example, in the space between the units of dollars and the tens of cents denominational members there is a type block 110 (Fig. 20) fixed to the bar 81 by a screw 111, which type block 110 carries any suitable characters such as the word "And". Another type block 112 similarly fixed to the bar 81 by a screw 113 in a position immediately following the units of cents denominational bar, carries suitable characters such as "Cts". If it is desired to substitute other wording, the respective type blocks may be easily removed and replaced by other blocks by unscrewing the screws 111 and 113.

Prefix character

In addition to printing the amount itself, mechanism is also provided for printing a suitable prefix in front of the amount to make it impossible to raise the amount of the check or other instrument by adding other figures or words in advance of the figures or words originally printed by the denominational members 65. The apparatus is arranged to print twice upon each sheet, as will be described in detail hereafter, and preferably two different prefix characters are provided, one to be printed during the first printing operation and the second to be printed during the second printing operation on the same sheet. For example, the prefix printed during the first operation may comprise the characters "Exactly $" as shown near the left hand end of the check illustrated in Fig. 23, while the prefix printed in connection with the other printing of the same check may comprise simply "$" as shown near the right hand end of the check in Fig. 23, or any other matter desired such as the name of the drawer of the check.

In the present instance, the two prefix character types are mounted upon a shiftable type carrying member 115, best shown in Figs. 6 to 8 inclusive and 20. This type carrying member 115 has two T-shaped slots formed therein in a direction substantially parallel to the printing line, and prefix types 116 and 117 have a somewhat T-shaped cross section so that they may be slid longitudinally into the slots in the carrying member 115, movement in one direction being limited by shoulders on the prefix types contacting with shoulders on the carrier. Thus the prefix types may be readily removed and replaced by other types having different characters thereon if desired. The characters to be printed are formed on the bottom surfaces of the types 116 and 117. For example, in order to print the check shown in Fig. 23, the prefix type 116 carries the characters "Exactly $" and the prefix type 117 carries simply "$".

The type character 115 is secured to an actuating bar 118 which extends in a direction transverse to the printing line and has at its front end a U-shaped portion terminating in an end 119 as shown in Fig. 3, this U-shaped portion lying upon and sliding over the top of the cross piece 120. The main portion 118 as well as the terminal portion 119 of this actuating bar both rest upon the cross piece 120, so that a two-point support is provided which prevents wabbling or tilting of the member. The actuating member near its rear end rests slidably upon the shaft 80, and the member passes through a slot in the abutment bar 81, which serves to aline the bar in a direction transverse to its length or longitudinally of the printing line. The carrier 115 lies just beneath the abutment bar 81 in slidable contact with the lower surface thereof, so that when the platen, to be described later, is actuated during a printing operation, the force transmitted to the prefix types is taken up by the abutment member 81 and does not distort the actuating member 118.

The actuating member is moved to shift first one and then the other prefix type into printing position by suitable means such as the link 121 pivoted at 122 to the actuating member 118 and at 123 to the arm 124 pivotally mounted upon the shaft 105 in the lower casing 50. The arm 124 has a downward extension 125 carrying a follower roller 126 arranged to be actuated by a cam 127, as will be described hereafter under the heading "Driving mechanism".

When the apparatus is at rest or in its normal inactive position, the parts are as shown in Fig. 6, with the prefix types 116 and 117 on either side of the printing line. They remain in this position until the platen 132 (described hereafter) begins to move downwardly after its printing operation, so that the corner of this platen adjacent the prefix type will not cause a smudge on the paper, as might occur if either of the prefix types were positioned at the printing line at the moment the platen 132 was raised. Then as the platen begins to descend, the cam 127 moves the actuating member 118 forwardly to bring the prefix type 116 into printing position on the printing line, as shown in Fig. 7, and the prefix is printed. The prefix types are then returned to a position on either side of the printing line, as in Fig. 6. Then when the platen 132 begins to descend after printing the amount a second time on the sheet, the cam allows the actuating member 118 to move rearwardly under the influence of a suitable spring to bring the prefix type 117 into the printing line, as shown in Fig. 8.

Platens

Printing platens are used to press the paper or other sheet material into contact with the printing types or with an inking ribbon associated with the types. The printing operation may be effected by producing a relative movement of types and platen toward and away from each other, which may be done either by moving both the types and the platen, or by moving the types toward a stationary platen, or by moving a platen toward stationary types. In the present instance it is preferred to keep the types stationary and to move the platen toward them, since this can readily be done by simple and effective mechanism.

In the preferred apparatus, the entire matter to be printed is not printed simultaneously, but is printed in two or more steps. Certain practical considerations which will be mentioned below make it undesirable to print the prefix simultaneously with the printing of the amount, because the amount may be of varying size and it is desired to print the prefix in predetermined relation to the amount irrespective of variations in the size of the latter. Hence one platen is used for printing the prefix, and another platen or platens are used for printing the amount, the paper being shifted between the printing of the prefix and the printing of the amount.

The printing types preferably have corrugated or otherwise roughened faces, and the platens have similarly roughened faces, so that the paper or other sheet material is macerated or shredded during the printing. In order to obtain proper maceration of the sheet, it is necessary to apply a substantial pressure per unit of area of the type faces. When the amount printed is of the maximum length, the combined area of all the type faces is considerable, and the total pressure required to effect proper shredding of the paper would be very large. In order to prevent the great strain which would fall upon the apparatus if the entire amount were printed at once, two separate platens are used, one for printing a portion of the amount and the other for printing the rest of the amount. These platens are moved successively to printing position, so that the full stress of the printing of the amount does not fall upon the operating mechanism at the same instant, but is somewhat distributed over the cycle of operation, thus greatly reducing the stress in the parts of the apparatus.

Referring to Figs. 5 and 20, a platen 131 is provided for printing part of the amount, such as the word "And" and the characters "Cts" appearing on the type members 110 and 112 respectively as well as the units and tens of cents interposed between these type members. A separate platen 132 is employed for printing the rest of the amount, namely, all denominations of dollars. One of these platens operates slightly in advance of the other, to distribute somewhat the stress on the operating mechanism, as already mentioned. A third platen 133 is employed for printing the prefix.

Each of these platens may be in the form of a bar extending in the direction of the printing line and held in a platen lever. Referring to Figs. 5 and 6, the platen 131 is mounted on the lever 134 pivoted on the shaft 135. The platen 132 is mounted on a similar lever 136 on the same shaft, while the platen 133 is mounted on another similar lever 137. Suitable adjusting screws such as 138 are provided to hold the platens in position on the levers and to allow slight adjustment of the platens so that they come into proper contact with the type members or with the sheet material interposed between the type members and the platens.

Near its rear or free end, each platen lever carries a pin 139 having a large hardened head projecting below the bottom of the lever to form a wear resisting bearing surface for cooperation with the hardened end of an adjusting screw 140 on a platen actuating lever. A separate actuating lever is provided for each platen lever, the actuating lever 141 being shown in Fig. 5 for actuating the platen lever 134 and platen 131, while the actuating lever 142 moves the platen lever 136 and platen 132. Similarly, the actuating lever 143 operates the platen lever 137 and platen 133. Each actuating lever is somewhat in the nature of a bell crank having the adjusting screw 140 on one arm and a follower roller 144 on the other arm for cooperation with an operating cam. A cam 145 is employed for operating the lever 141, another cam 146 for operating the lever 142, and a third cam 147 for operating the lever 143, all three of the cams being fixed to a shaft 148 rotated by mechanism described below under the heading "Driving mechanism". When the shaft 148 is rotated, the cam 145 first operates its actuating lever 141 to move the platen 131 upwardly to effect printing of the cents together with the characters "And" and "Cts". Almost at the same instant but at a slight interval after the operation of the platen 131, the cam 146 moves the platen 132 to its printing position to print the dollars. Then a longer interval occurs, during which the sheet material is shifted as will be described hereafter, and the cam 147 then moves the platen 133 to print the prefix.

It is desirable to print by means of an inking ribbon which is moved slightly after each printing operation in a direction transversely of the printing line. The extent of movement of the ribbon, for the sake of economy, is relatively small at each printing operation, so that a given point on the ribbon may serve for printing several impressions before it finally passes completely across the printing line. Obviously as a given point on the ribbon progresses across the printing line it has more and more ink extracted therefrom and becomes more nearly used up. As a given point on the ribbon first enters the printing line or printing zone, it is perfectly fresh and fully inked. By the time the given point reaches the middle of the printing line or zone, it has been used for a number of impressions and some ink has been extracted therefrom, while by the time it reaches the extreme edge of the printing line toward which it is being fed, it has been used still more often and still more ink has been extracted. For this reason, it is found in practice that if uniform pressure is applied by the platen across the face of the printing types, the impression printed on the paper is apt to be quite heavily inked near one side of the printing line and to be progressively less and less inked or more and more faint across the faces of the characters towards the other edge of the printing line. The impression will be heaviest along the side of the printing zone from which the ribbon is being fed, and lightest along the side toward which the ribbon is being fed, as it travels across the type faces.

To overcome this undesirable, uneven impression and to compensate for the using up of the ribbon, the present invention comprises the application of greater pressure upon that portion of the ribbon which has already been used than upon that portion which is fresh. This result is attained by forming the cooperating surfaces of each of the platens and the type members in such manner that they pinch the ribbon and sheet material tighter at one edge of the printing line than at the other, and preferably so that the tightness of pinching or pressure increases progressively across the face of the type. This principle is illustrated somewhat diagrammatically in Fig. 19, in which a type member is shown at 66 having various printing characters on its lower face, and a platen is indicated at 131a. The ribbon is indicated at 150, and is fed in the direction of the arrow 151. As shown, the upper surface of the platen 131a is not parallel to the surface of the type faces, but is inclined or beveled relative to the type faces so that when the platen is moved upwardly it will exert greater pressure on the ribbon along the edge of departure than along the edge of approach. Thus if a piece of paper be inserted between the ribbon and the platen, the paper will be pressed with greater pressure against that portion of the ribbon which has already been used than against that portion of the ribbon which is fresh, and the relative shapes of the type and platen are so formed that the greater pressure will be just sufficient to compensate for the use of the ribbon, so that the impression produced on the paper will be of substantially uniform nature all the way across the printing line.

In actual use, an inclination sufficient to produce the desired result is so slight that it would scarcely be noticed in the drawings, and hence has been exaggerated in Fig. 19.

In some instances it is desired to print both upon the face and upon the back of the paper or other sheet material, as the printing upon the back increases the security against alteration of the figures once they have been printed. The present machine is provided with such an arrangement, the ribbon being so threaded that it passes between the type 66 and the paper 152, as illustrated at 150a in Fig. 18, and also between the paper 152 and the platen 131 as illustrated at 150b. The direction of feeding of the ribbon 150a above the paper is opposite to the direction of feeding of the ribbon 150b below the paper, as will be apparent when the ribbon arrangement is described in detail below under the heading "Ribbon mechanism". Under these circumstances, where the ribbons on the opposite sides of the paper feed in opposite directions, it is not feasible to compensate for use of the ribbon on both sides of the paper and compensation may be eliminated or it may be confined to one side or the other as desired. Thus the upper surface of the platen 131 may be formed so as to be exactly parallel to the type face when the platen is in its printing position, to produce uniform pressure over the entire area of the type face. With this arrangement, the impression on each surface of the paper will be slightly fainter along the edge of the printing line on the side of the latter from which the ribbon respectively departs. The difference in the heaviness or faintness of the printing impression across the printing line is relatively slight, however, so that it is not really objectionable under most circumstances and it may be disregarded.

On the other hand, the impression on the front or top surface of the paper is usually considered to be more important than the impression on the back or bottom surface, and where it is desired to make a perfect impression on the front, the platen and type faces are so shaped relative to each other as to produce increased pressure toward one side, in the manner described in connection with Fig. 19. This increased pressure will be on the wrong side or edge of the printing line so far as the impression on the back of the paper is concerned, and will tend to exaggergate somewhat the faintness along one side of the bottom impression. This is not a serious objection, however, because the impression on the front of the paper is the more important of the two, as above mentioned, and it is frequently desirable to obtain a perfect impression on the front even at the expense of exaggerating the non-uniform effect on the back.

*Paper feed*

As was mentioned in the general outline, the present apparatus is provided with automatic paper feeding means which is effective to move the sheet material from the position in which it is deposited by the operator to one or more printing positions and finally to discharge the sheet from the machine into any suitable receptacle or to some other machine for effecting further operations upon it. This paper feed, in the preferred embodiment, comprises a continuously moving belt 160 (Figs. 1, 2, 3, 5, 13, and 14) which extends across the top of the lower casing 50 and through the space between it and the upper casing 51, running over a suitable pulley 161 (Figs. 1 and 5) at the upper right hand corner of the machine and a pulley 162 (Fig. 1) at the upper left hand corner of the machine. The belt 160 travels in a direction of the arrow, or leftwardly when viewed as in Fig. 1, and after passing over the pulley 162 it extends downwardly, around a pulley 163 (Fig. 2) and rightwardly under the bottom of the casing to another pulley 164, where it turns upwardly and runs to the pulley 161. The belt is driven by means of a shaft 165 (Fig. 5) to which the pulley 161 is fixed, this shaft having a driving pulley 356 secured thereto which is driven constantly from a motor as will be described under the heading "Driving mechanism".

The paper is guided by a paper guide of adjustable width, best shown in Figs. 1 to 3 inclusive, and comprising a front guide member 170 extending across the machine and having an overturned retaining flange 171, and a rear guiding member 172 having a similar overturned flange 173. The members 170 and 172 provide supports on which the paper slides leftwardly under the influence of the belt 160, which overlies the member 170, while the flanges 171 and 173 serve to aline the sheets in a direction transversely of its movement and prevent displacement thereof. The members 170 and 172 are slidably mounted on rods 174 and 175, so that they may be slid along these rods to accommodate sheets of different widths or to vary the position of the sheets relative to the printing line, and thumb screws 176 may be tightened to hold the paper guides in set position on the rods.

An arm 178 (Figs. 1 and 13) pivoted at 179 to a bracket 180 fixed to the right hand side of the upper casing 51 carries a roller 181 which rides upon the belt 160 and rotates as the belt travels. When a piece of paper or other sheet material is placed by the operator in the paper guides 170 and 172 and moved by hand a slight distance leftwardly, the advancing edge of the paper enters between the roller 181 and the belt 160, and the weight of the roller holds the paper down on the belt with sufficient force so that the belt moves the paper along leftwardly with it. The weight of the roller is not so great, however, but that the movement of the paper may be stopped by contact with suitable stops which will be described hereafter, and when the advancing edge of the paper comes into contact with one of such stops, the movement of the paper ceases and the belt simply slips relative to the stationary paper.

An arm 182 (Figs. 1 and 13) is pivoted at 183 to a bracket 184 on the left hand side of the upper casing 51. This arm 182 carries at its left end a roller 185 riding on the belt 160 and also carries two pivoted arms 186 and 187 which have at their free ends rollers 188 and 189 respectively, also riding upon the feeding belt. As the paper moves leftwardly, it passes successively under the rollers 189, 188, and 185, the weight of which holds the paper in contact with the belt to insure proper feeding of the paper, but these rollers are not so heavy as to prevent stoppage of the movement of the paper when it comes into contact with the paper stops described hereafter.

*Paper stops*

As has previously been mentioned, the paper or other sheet material tends to move leftwardly between the printing types and platens because of its engagement with the continuously moving belt 160. Paper stops are provided to stop the sheet at one or more desired points to enable printing to be effected while the sheet is stationary so that the matter printed will be accurately located thereon. The first stop is illustrated at 201 in Figs. 5, 9, and 10, and comprises a piece of sheet material having one end extending upwardly through a slot 202 (Figs. 9 and 10) in the top of the lower casing 50 when the stop is in its effective position. The opposite end of the stop is bent back upon itself so as to be somewhat U-shaped as shown in Figs. 5 and 10, and both branches of the U-shaped portion have apertures through which extends a non-circular shaft 203, so that the paper stop can slide along the shaft but is non-rotatably secured thereto. A spring 204 mounted on the stop bears frictionally against the shaft and holds it sufficiently tightly to retain it in any adjusted position along the shaft, although the stop may easily be moved forcibly by hand in a direction longitudinally of the shaft and set in any desired position thereon.

When the apparatus is in normal inactive position, the first stop 201 is in the position shown in Fig. 9, projecting upwardly through the slot 202 into the path of travel of the sheet. As the sheet is fed leftwardly by the belt 160, it comes into contact with this stop and is held stationary thereby while the amount or any other desired matter is printed on the sheet by the actuation of the platens 131 and 132. The stop 201 is then withdrawn by means of a link 205 pivoted at 206 to a rocker arm 207 fixed to the shaft 203. This link, in turn, is pivoted at its opposite end to an operating lever 208 pivoted on the shaft 209 and having a follower roller 210 cooperating with a cam 211 on a shaft 212 which is driven by means described hereafter under the heading "Driving mechanism". When the cam moves the operating lever in a counter-clockwise direction about the shaft 209, when viewed as in Fig. 9, this moves the link 205 rightwardly, turns the shaft 203 in a counter-clockwise direction, and moves the end of the stop 201 downwardly through the slot 202 into an ineffective position, so that the sheet material may again move leftwardly under the influence of the belt 160. Actually, in order to hasten the operation of the machine, the cam 211 is so timed that the stop 201 is withdrawn while the printing operation effected by the platens 131 and 132 is still being completed, because the paper at this time is held stationary by pressure of the platens and the stop is not needed. Hence by the time the platens begin to move away from the type members, the stop 201 is already withdrawn and the paper is free to move to its next position as soon as the platens have been retracted sufficiently to permit it to do so.

The next printing position of the paper is a variable one, since the matter printed by the type members 65 may be of variable length and since it is desired to print the prefix in a predetermined position relative to this matter of variable length, irrespective of the variation thereof. With the printing types arranged in the relative positions in which they are placed in the present apparatus, as shown for example in Fig. 20, it is obvious that when matter involving all available denominations is printed by the members 65, the paper need move only a comparatively short distance in order to have the prefix printed closely adjacent the beginning of the matter printed by the members 65. On the other hand, if the higher denominations of the members 65 are not used for printing, the paper must be shifted a greater distance in order to have the prefix printed in the same relative position, closely adjacent the beginning of the matter printed by the members 65. If the paper, when only a few denominations were printed, were moved only through the same distance as when the maximum number of denominations were printed, there would obviously be a space between the prefix and the matter printed by the members 65, which space would be of a size depending on the number of denominations not printed. Such a space between the prefix and the rest of the matter is especially undesirable in checks and similar instruments, because there is a possibility that numbers or words might be inserted between the prefix and the amount in order to raise the amount of the check.

In order to effect the desired variable feeding of the sheet between the printing of the amount and the printing of the prefix, the second paper stop, indicated at 215 in Figs. 5 and 10, is mounted upon a rod 216 which is movable longitudinally in the direction of feeding of the sheet material or in the direction of the printing line so as to carry the stop 215 to various positions. This rod 216 is controlled by the printing mechanism for printing the amount so that the rod is moved in accordance with the length of the amount printed, this mechanism being described hereafter. The paper stop 215 is pivoted at 217 to a carrier 218 which is non-rotatably mounted on the rod 216, but slidable thereon, being held in any position in which it is set by means of a spring 219, in a manner generally similar to the stop 201 on the shaft 203. Thus the stop 215 may be adjusted or set in various positions lengthwise of the rod 216 by sliding the carrier 218 along the rod, but when the stop is once set in desired position, the spring 219 is frictionally engaged with the rod with sufficient force so that the stop moves back and forth as a unit with the rod when the latter is shifted by its control mechanism.

This control mechanism will now be described with particular reference to Figs. 3, 10, 11, and 12. A rod 225 is arranged in the upper casing 50 parallel to and slightly in front of the abutment member 81, and on this rod is slidably mounted a feeler 226 having a flange 227 extending into a longitudinal slot 228 (Figs. 10 and 20) in the member 81, so as to allow the feeler 226 to slide longitudinally along the rod 225 but to prevent rotation thereon by reason of the engagement of the flange 227 in the slot 228.

This flange 227 on the feeler 226 is near the lower edge thereof, and, as shown in Fig. 4, it lies in a line just ahead of a shoulder 230 on each of the printing members 65 when the latter are in their rearmost or ineffective position. It will be remembered, however, that the units of dollars member 65 is never moved to an ineffective position but prints the numeral zero whenever no other digit is printed. The shoulder 230 on the units of dollars member 65 is therefore one step forwardly from the inoperative position which may be occupied by the printing members of higher denomination, so that the member 65 in the units of dollars denomination is always in the path of travel of the flange 227 on the feeler, and acts as a stop limiting the possible movement of this feeler unless the feeler previously comes into contact with a printing member of higher denomination.

If any printing member 65 in a denomination above the units of dollars denomination is moved from its ineffective non-print position to an effective position for printing any digit from zero to nine inclusive, the shoulder 230 of such printing member will be moved forwardly so that the flange 227 on the feeler will no longer clear the shoulder. Hence if an attempt is made to move the feeler 226 rightwardly along the rod 225, the flange 227 on the feeler will come into contact with the printing member 65 of highest denomination which has been shifted from an ineffective non-printing position to an effective printing position, and further movement of the feeler will thus be prevented.

A stud 232 near the top of the feeler 226 engages a slot in the forward end of the lever 233 pivoted at 234 to a bracket 235 secured within the upper casing 51. The pivot 234 of this lever is at the mid-point thereof, so that the rear end will move through the same distance as the front end thereof. The rear end of the lever has a slot in which is engaged a stud 236 on a shaft 237 which passes centrally through the pivot sleeve 53 and is slidable longitudinally therethrough. Since the sleeve 53 constitutes one of the pivots about which the upper casing 51 oscillates relative to the lower casing 50, when the casing portions are opened up, it is seen that the shaft 237 is in alinement with the pivotal axis and thus does not interfere with the opening or closing of the upper casing relative to the lower casing.

The shaft 237 near its opposite end is slidable longitudinally through a bearing bracket 238 (Figs. 10 and 12). The shaft carries two collars 239 and 240 between which an arm 241 is rotatably mounted on the shaft and extends downwardly through a slot 242 in the top of the lower casing 50, which slot, as shown in Fig. 12, is made of sufficient length so that the arm 241 may slide back and forth therein when the shaft 237 moves longitudinally. The arm 241 is rotatable on the shaft 237 and held between the two collars in preference to being rigidly connected to the shaft, in order that the shaft 237 may be free to be rotated by the lever 233 when the upper casing 51 is opened up relative to the lower casing 50.

A stud 243 on the arm 241 engages a slot in one arm 244 of a bell crank fixed to a shaft 245 which is rotatably mounted in ears 246 of a strip of sheet material 247 suitably mounted within the lower casing 50 as shown in Figs. 5 and 11. The forward end of the shaft 245 has fixed thereto an upwardly extending arm 250 as shown in Figs. 9 and 11, which arm 250 has a slot at its upper end in which is engaged a stud 251 fixed on the rod 216 on which the paper stop 215 is mounted. The length of the arm 250 from the stud 251 to the shaft 245 is the same as the length of the arm 244 from the stud 243 to the shaft 245. Thus, through the train of connections above described, when the feeler 226 moves rightwardly from its normal position shown in Fig. 3 to any other position such as that shown in Fig. 10, where it is in contact with the printing member 65 in the hundreds of dollars denomination, this rightward movement of the feeler will be transformed into a leftward movement of the shaft 237 through the same distance, which will rock the shaft 245 in a counter-clockwise direction when viewed from the front of the machine or in a clockwise direction when viewed from the rear as in Fig. 12, and this movement of the shaft 245 will produce a leftward movement of the stop carrying rod 216 through the same distance as the rightward movement of the feeler 226. Thus means is provided for controlling the paper stop 215 from the printing mechanism, and more particularly from the printing members 65, so that the movable stop 215 is positioned in accordance with the length of matter or number of denominations printed by the printing mechanism.

A spring 253 (Fig. 12) connected to the bell crank arm 244 tends to turn the arm in a clockwise direction when viewed from the rear as in Fig. 12 or in a counter-clockwise direction when viewed from the front of the apparatus, and thus tends to shift the feeler 226 rightwardly into contact with the highest denomination printing member which has been moved from an ineffective position to an effective printing position. Such movement of the feeler, however, is prevented until the proper moment by means of a cam 255 (Fig. 11) on the cam shaft 212, which engages a follower roller 256 on a lever 257 pivoted on the shaft 209, which lever 257 is connected by a link 258 to the other arm 259 of the bell crank 244, as shown in Fig. 12. Thus this cam 255, operated by connections to be described hereafter under the heading "Driving mechanism", holds the bell crank 244, 259 against the action of the spring 253 and thus holds the feeler 226 in the position shown in Fig. 3 until the desired moment, when the cam 255 releases the bell crank to permit the spring 253 to move the feeler 226 rightwardly and simultaneously to shift the paper stop 215 leftwardly through the same distance.

As the movement of the paper stop 215 is controlled from the printing mechanism and as it is positioned in accordance with the length of matter printed, it may be said to allow movement of the paper through a distance which is a function of the length of matter printed. This distance, it will be seen, is inversely proportional to the length of matter printed. That is, when the matter printed by the members 65 is relatively short, the paper moves a greater distance after such printing until it comes into contact with the stop 215 than when a longer line of matter is printed by the members 65, in which case the paper moves a lesser distance until it comes into contact with the stop 215. In any event, when the paper reaches the stop 215 and is held stationary thereby, the platen 133 is then actuated to print the prefix. Because of the inter-connection between the stop 215 and the amount printing means which has been described in detail above, the prefix printed when the platen 133 is actuated will be in predetermined relationship to the amount printed by the members 65, irrespective of variations in the length of the latter, and will be closely adjacent the amount whether this amount be of few or many denominations.

It has been mentioned above that it is desirable in many instances to print twice on the same sheet. For example, a check may be printed in the form shown in Fig. 23, with the amount printed once on the left hand portion of the check and again on the right hand portion of the check, thus making it more difficult to alter the amount as originally written on the check. To this end, means is provided for withdrawing the stop 215 and allowing the paper to continue its leftward movement under the influence of the belt 160 until it is in position to have the amount and prefix again printed thereon in the desired location.

The means for withdrawing the stop 215 comprises a shaft 265 (Figs. 5 and 9) having a bail 266 rotatably mounted thereon and extending for a considerable distance along the shaft so as to cover the entire maximum range of movement of the stop 215 in any position in which the stop would be set along the rod 216. The upper edge of this bail 266 engages a slot 267 in a downwardly extending tail on the stop 215. Hence oscillation of the bail 266 on the shaft 265 oscillates the stop 215 about its pivot 217 without affecting the longitudinal position of the stop along the rod 216, and in all positions of the stop the slot 267 is engaged by the bail 266 so that this operating mechanism is effective in any position of the stop.

The bail 266 is operated by a link 268 pivotally connected to the bail at 269, the opposite end of the link being pivoted at 270 to a bell crank 271 rotatably mounted on the shaft 209, the other arm of the bell crank having a follower roller 272 cooperating with a control cam 273 on the cam shaft 212, which is operated as described hereinafter under the heading "Driving mechanism". Rotation of this cam oscillates the bell crank 271 to move the link 268 leftwardly when viewed as in Fig. 9, or rearwardly of the machine when viewed as in Fig. 5, and thus causes the bail 266 to oscillate in a counter-clockwise direction, which moves the stop 215 in a clockwise direction about its pivot 217 and moves the end thereof downwardly through the slot 202 to an ineffective position where it no longer contacts with the paper.

When the stop is thus withdrawn, which may be an instant before the printing of the prefix is completed because the printing platen will then hold the paper stationary, the paper may move leftwardly under the influence of the belt 160 as soon as the platen retracts sufficiently to free the paper, which then comes into contact with a third stop 275 similar to the first stop 201 except that it is mounted on a different shaft 276, along which it is settable to different positions like the stop 201 on the shaft 203. When the paper comes into contact with the third stop 275, its movement is arrested and the amount printing platens 131 and 132 are actuated a second time to print the amount a second time upon the sheet, near the right hand end thereof, the exact position being determined by the position in which the stop 275 is set lengthwise of its shaft 276. At or before the completion of this second printing of the amount, the stop 275 is withdrawn in a manner generally similar to the withdrawal of the stop 201. The mechanism for accomplishing this comprises an arm 277 fixed to the shaft 276, which arm is pivotally connected at 278 to a link 279 the other end of which is pivoted at 280 to a lever 281 rotatable on the shaft 209, which lever has a follower roller 282 cooperating with a cam 283 mounted on the cam shaft 212.

After the withdrawal of the third stop 275 and the completion of the second printing of the amount, the paper then moves leftwardly again under the influence of the belt 160 until it comes into contact with a fourth stop 285 which is in general similar to the second stop 215 and which, like the second stop, is pivoted at 286 to a carrier 287 mounted on and adjustable lengthwise along the rod 216. Since the fourth stop 285 is mounted on the rod 216, it partakes of the longitudinal movements of this rod and thus is adjusted in exactly the same way as the stop 215, under the control of the printing mechanism and in accordance with the length of the amount printed. Hence when the stop 285 has been properly set on the rod 216 with respect to the desired position of the stop 275, this stop 285 will hold the paper in proper position to print a prefix in connection with the second printed amount, and in predetermined relation to that amount irrespective of variations in the length thereof. When the paper comes into contact with the fourth stop 285 and is held thereby, the printing platen 133 is then actuated a second time to print a prefix in connection with the second printed amount. Preferably, however, this prefix is not identical with the prefix printed in association with the amount, but is different therefrom, printing of a different prefix being attained by the shifting of the prefix type carrier 115 in the manner which has been described under the head "Prefix character".

At or before the completion of the printing of the second prefix character, the fourth stop 285 is withdrawn to an ineffective position by mechanism in general similar to the mechanism for withdrawing the second stop 215. For example, there may be provided a shaft 290 (Figs. 5 and 9) having a bail 291 oscillatably mounted thereon, the upper edge of which bail engages a slot 292 in a downwardly extending tail on the stop 285 in any position to which the stop may be shifted in a direction longitudinally of the member 216. This bail 291 is pivoted at 293 to a link 294 the other end of which is pivoted to a bell crank 295 having a follower roller 296 cooperating with a cam 297 on the cam shaft 212. When the cam 297 oscillates the bell crank 295, this pulls on the link 294 and oscillates the bail 291 to withdraw the stop 285 to an ineffective position. Hence the sheet is free to move under the influence of the belt 160 as soon as this stop is withdrawn or as soon as the printing of the prefix is completed, whichever occurs later, and the sheet then issues from the left hand side of the machine into any suitable receptacle or into another machine which may perform further operations upon it.

Springs are provided which tend to hold the various stops in effective position, the cams being effective to withdraw the stops against the action of the springs. For example, as shown in Fig. 5, springs 300 and 301 may each have one end connected to the shaft 290 while the other ends of the springs are connected to studs on the links 205 and 279 respectively. Likewise springs 302 and 303 may each have one end connected to the shaft 265, the other ends being connected respectively to the links 268 and 294. Thus these springs will tend to move each stop upwardly through the slot 202 into an effective position.

In some instances it may be desirable to omit one of the printing operations upon a sheet. The present apparatus has been designed so that either one of the printing operations may be omitted at will, and the sheet may be printed in one position only if desired.

If it is desired to omit the second printing for which the sheet is ordinarily positioned by the stops 275 and 285, so that only the first printing operation is performed on each sheet, this may be accomplished by rendering the stops 275 and 285 ineffective so that they do not come into the path of travel of the sheet. Hence after the first printing operation, the sheet will be moved forwardly by the belt 160 and discharged from the machine before the platens are actuated for the second printing operation.

To hold the stops 275 and 285 in an ineffective position, studs 311 and 312 (Figs. 2 and 5) may be provided, the studs being slidable respectively in slots 313 and 314 and being held in any desired position in the slots by tightening the thumb screws 315 and 316. When the stud 311 is at the forward end of its slot, or the right hand end when viewed as in Fig. 2, it does not interfere with any of the moving parts of the apparatus, but when it is moved to the rear or left hand end of this slot and held in this position by tightening of the thumb screw 315, then the stud 311 lies against the front of the long stud 293 on the bail 291, and prevents this bail from moving forwardly under the influence of its spring 303 when it is released by the cam 297. Thus the stud 285 is held in its downward or ineffective position notwithstanding the fact that it is released by its control cam. Similarly, when the stud 312 is moved to the forward end of its slot, or to the right hand end when viewed as in Fig. 2, this stud lies against the rear surface of the arm 277 on the shaft 276, and holds this arm in position to maintain the stop 275 depressed or ineffective against the action of its spring 301 even when the stop is released by its control cam 283.

Hence in order to omit the second printing operation and to print on each sheet only in the position determined by the stops 201 and 215, it is simply necessary to loosen the thumb screws 315 and 316, move the studs 311 and 312 respectively rearwardly and forwardly in their slots, and again tighten the thumb screws. If it is desired to resume printing in both positions on each sheet, it is but the work of a moment to loosen the thumb screws and slide the studs to the opposite ends of their slots, which again renders the stops 275 and 285 effective to hold the paper in position for the second printing operation toward the right hand end of the sheet. In any event, the exact position on the sheet in which either set of stops causes printing may be determined as desired by adjusting the stops longitudinally on their various supporting members.

If it is desired to omit the first printing operation on each sheet, in the position determined by the stops 201 and 215, and to print only in the second position determined by the stops 275 and 285, this may be done by reversing the cycle of operation of the stops so that when a sheet is fed into the machine, the stops 275 and 285 are moved to an effective position first before the stops 201 and 215 come into play. Hence, as the sheet travels leftwardly with the belt 160, it will continue its movement until arrested by the stops 275 and 285, and the first actuation of the printing platens will then print the matter in the position determined by these stops, near the right hand end of the sheet. The paper will then be fed out of the machine, and although the stops 201 and 215 will be raised to an effective position and the platens will be actuated once more, no sheet will be present in the apparatus at this time so that no printing will take place in the position determined by these latter stops.

This reversing of the cycle of operation of the stops, in order to omit one of the printing operations, may conveniently be accomplished by mounting the stop control cams 211, 273, 283, and 297 so that they may be moved through half a revolution relative to the shaft 212 on which they are mounted. To enable this to be accomplished rapidly and with a minimum of effort, the four control cams are fixed to a sleeve 320 (Fig. 21) which is rotatable on the shaft 212, and the cams are held rigidly relative to each other by pins 321 (Figs. 21 and 22) which extend through the cams and tie them to each other. The shaft 212 carries an arm 322 fixed rigidly thereto in a position adjacent the cam 283, and this arm has a spring plunger 323 which may engage either one of two holes 324 formed in the cam 283 at diametrically opposite points. Thus when the plunger 323 is engaged in either one of the holes 324, the stop control cams are rigidly secured to the shaft 212 and rotate therewith. When the plunger is in one of the holes, the cams are in their normal position for operating the stops through their normal cycle, in which the stop 201 is first raised, then the stop 215, then the stop 275, and finally the stop 285. If the plunger 323 be withdrawn and the cam assembly be swung around through 180° until the plunger engages the other hole 324, then the cycle of operation of the stops will be reversed and the stop 275 will first be moved to effective position, then the stop 285, then the stop 201, and finally the stop 215. Thus the printing in the position controlled by the stops 201 and 215 will be omitted entirely because the advancing edge of the paper will have passed beyond these stops prior to the time that they are raised.

Driving mechanism

The machine may be driven from any suitable source of power, but preferably the mechanism is operated from an electric motor mounted on the machine so that the machine is entirely self-contained and portable in character.

Referring now to Fig. 5, there is shown an electric motor 351 mounted on a bracket rigidly connected to the lower casing 50 near the right hand end thereof, which motor has a shaft 352 carrying two belt pulleys 353 and 354. Over the latter runs a belt 355 driving the pulley 356 on the shaft 165 which, through the pulley 161, constantly drives the feeding belt 160. Over the other pulley 353 runs a belt 357 driving a pulley 358 on a worm shaft 359. This worm shaft carries a worm meshing with and driving a worm wheel 360 on a clutch shaft 361, which clutch shaft is thus constantly rotated in a clockwise direction when viewed as in Fig. 4.

The clutch shaft 361 carries a disk 362 fixed thereto, which disk has its periphery formed in the shape of alternating projections and depressions so as to constitute teeth. Adjacent this toothed disk 362 is another disk 363 having pivoted thereto at 364 a dog 365 provided with an ear arranged to engage in any one of the depressions in the periphery of the disk 362. This dog has a tail 366 extending into a notch in a control dog 367 pivoted at 368 to the disk 363 and urged by a spring 369ª in a clockwise direction to tend to engage the dog 365 with the teeth of the disk 362. Such clockwise movement of the dog 367 is normally prevented, however, by contact of an ear 369 on the dog with a control member 370 fixed to a shaft 371 rotatable within the casing. A spring 372 tends to hold this control member 370 in position to engage the ear 369 of the dog 367, as shown in Fig. 4, and another spring 373 holds a member 374 loosely mounted on the shaft 371 against the periphery of the disk 363 so that, when the disk 363 is stationary as in Fig. 4, the member 374 lies just behind a shoulder 375 on the disk and prevents reverse or counter-clockwise rotation of the disk 363.

Referring now to Figs. 1, 3, and 14, a trip member or actuating member 380 is mounted in a position conveniently accessible to the operator, and preferably along the right hand side of the upper casing 51 near the forward end thereof. This member 380, as best shown in Fig. 14, is pivoted at 381 and 382 to a pair of bell cranks 383 and 384 respectively, which are pivoted at 385 and 386 to the casing. The other arm of the bell crank 383 is pivoted at 387 to a link 389 extending rearwardly within the upper casing 51, while the other arm of the other bell crank 384 is pivoted at 388 to a link 390 connected to the pivot 387 of the bell crank 383 so that these two bell cranks act in unison. A spring 391 connected to the link 390 tends to move this link forwardly and thus to hold the actuating member 380 in its uppermost position, but the member may be depressed against the action of this spring to force the link 389 rearwardly.

The rearward movement of the link 389 when the actuating member 380 is depressed causes counter-clockwise rotation of a bell crank 392 pivoted on the casing, to one arm of which the link 389 is pivotally secured at 393. The other arm of the bell crank 392 carries a stud 394 overlying an arm 395 of a bell crank pivoted at 396 and having an arm 397 extending downwardly into the lower casing 50. This arm 397 is pivotally connected to a link 398 the forward end of which is slotted at 399 and guided and supported by a pin 400 engaging the slot and mounted on one arm of a bell crank 401. A spring 402 tends to move the arm 397 forwardly and thus to hold the link 398 in a forward position.

The link 398 carries a stud 403 which lies directly in front of an arm 404 fixed to the shaft 371. Hence when the actuating member 380 is depressed, the link 389 will be moved rearwardly, the stud 394 will be depressed to move the arm 395 downwardly and the arm 397 rearwardly, the link 398 will be carried rearwardly against the action of the spring 402, and the stud 403 will move the arm 404 rearwardly, turning the shaft 371 in a clockwise direction. This will turn the control member 370 in a clockwise direction and raise it above the lug 369 on the dog 367, allowing the spring 369ª to move the dog in a clockwise direction about its pivot 368, which will shift the dog 365 in a counter-clockwise direction against the periphery of the constantly rotating disk 362. The dog 365 will then drop into the next depression or interdental space in the periphery of this disk and the rotation of the disk will be transmitted through the dog 365 to the disk 363.

The disk 363 also has a dog 410 pivoted thereto at 411. This dog has a tail 412 which, when the parts are in the stationary position shown in Fig. 4, contacts with the shaft 148 to hold the dog against the action of the spring 413 which tends to move it in a clockwise direction about its pivot. This dog has an ear 414 in position to engage the periphery of the disk 362 when the dog moves in a clockwise direction from the position shown in Fig. 4. When the dog 365 moves into contact with the rotating disk 362 as a result of depression of the actuating member 380, this causes the rotation of the disk 362 to be transmitted to the disk 363 as above mentioned, and as soon as this rotation commences, the tail 412 of the dog 410 rides off of the shaft 148 so that the spring 413 moves the ear 414 into contact with the disk 362. The position of the dog on the disk 363 is so arranged that when the dog 365 is engaged in one interdental space, the ear 414 will fit into another interdental space of the disk 363. Thus the disks 362 and 363 will be locked to each other by the dogs 365 and 410, so that the disk 363 will be properly driven in unison with the disk 362 and overriding or too rapid rotation of the disk 363 is prevented by the dog 410 which prevents the disk 363 from rotating faster than the disk 362.

Rigidly attached to the disk 363 is a gear 420 (Fig. 5) which meshes with a gear 421 on the platen cam shaft 148. The gear 420 has twice as many teeth as the gear 421, so that one complete revolution of the disk 363 will rotate the platen cam shaft 148 through two complete revolutions, thus effecting the two printing operations on the piece of sheet material.

The disk 363 also has attached thereto a gear 422 which meshes with a gear 423 on the cam shaft 212. The gear 422 has the same number of teeth as the gear 423, so that for each actuation of the clutch and single rotation of the disk 363, the cam shaft 212 will be rotated through one complete revolution.

This cam shaft 212 carries the cam 108 which actuates the aligning bar 85. (See Fig. 4.) The cam 108 is so placed relative to the normal position of rest of the cam shaft 212 that the alining bar 85 will be actuated as soon as the cam shaft begins its rotation; that is, at the very beginning of the cycle of operation of the machine. The alining bar will be held in its actuated or locking position until the end of the cycle of the machine, and will be released and returned to normal position only when the cam shaft 212 has substantially completed its full revolution.

This cam shaft 212 also carries the cam 127 (Fig. 6) which actuates the carrier 115 for the prefix printing types. This cam 127 is of such configuration, and the cam is so placed relative to the normal position of the shaft 212, that at the beginning of the cycle the two prefix printing types 116 and 117 will be on either side of the printing line, as shown in Fig. 6. After the actuation of the printing platens 131 and 132 to print the amount, and just before the actuation of the platen 133, the cam 127 shifts the prefix printing type 116 to effective printing position on the printing line, as shown in Fig. 7. Then during the first part of the second half of the cycle of operation, the printing types 116 and 117 are brought back to the position on either side of the printing line as shown in Fig. 6, and during the latter part of the second half of the cycle just prior to the second actuation of the platen 133, the other prefix printing type 117 is moved to effective printing position on the printing line, as shown in Fig. 8.

The cam shaft 212 also carries the feeler cam 255 (Fig. 11) which is so shaped and placed on the shaft that at the very begining of the cycle of operation the cam releases the lever 257 to allow the spring 253 (Fig. 12) to position the feeler 226 in accordance with the position of the printing members 65. Only toward the end of the cycle of operation, as the stop 285 is being withdrawn, does the cam again raise the lever 257 and move the feeler 226 back to its normal position shown in Fig. 3.

The cam shaft 212 also carries the stop cam assembly shown in Figs. 5 and 21, which assembly can be shifted through 180° to either one of two positions, as before mentioned. When the plunger 323 is in the one of the holes 324 which constitutes its normal position, then when the shaft 212 is in its normal or stationary position, the first stop 201 is elevated to an effective position as shown in Fig. 9, and the other three stops are withdrawn. During the single complete revolution of the shaft 212, the cam 211 is effective to withdraw the stop 201 at about the same instant that the platens 131 and 132 are operated, and at this time the cam 273 raises the stop 215, which meanwhile has been shifted more or less leftwardly due to the action of the feeler 226. The second stop 215 remains in an elevated or effective position until the platen 133 is actuated to effect printing of the prefix, and then the cam 273 withdraws the stop 215, at or before which time the cam 283 elevates the stop 275. While the platens 131 and 132 are being actuated again during the second revolution of the platen cam shaft 148, the stop 275 is withdrawn and the cam 297, at or before this time, elevates the stop 285 to hold the paper for the second printing of the prefix. Then at the end of the cycle, or the end of the single complete revolution of the cam shaft 212, the stop 285 is withdrawn and the stop 201 is elevated to an effective position ready to receive the next sheet of paper to be printed upon.

If the cam assembly be turned 180° relative to the shaft 212, so that the plunger 323 is placed in the other hole 324, then the cycle is reversed and the stop 275 is initially in elevated position, all the other stops being withdrawn. Then during the revolution of the cam shaft 212, the stop 275 is withdrawn and the stop 285 elevated, then the latter withdrawn and the stop 201 elevated, then the latter withdrawn and the stop 215 elevated, and finally the stop 215 is withdrawn and the stop 275 is elevated at the end of the cycle ready to receive the next sheet to be printed upon.

Returning now to the clutch mechanism shown in Figs. 4 and 5, it has been described how this clutch is closed by depression of the actuating member 380 to initiate the single revolution of the disk 363, which effects driving of the machine through the complete cycle. The clutch is opened again to disconnect the drive at the end of one complete revolution as follows:

After the member 370 has been momentarily raised to allow the lug 369 on the dog 367 to pass it, the member 370 again drops to the normal position shown in Fig. 4 so that it is in the path of the lug 369 as the latter comes around with the rotation of the disk 363. Hence at the end of one complete revolution, the lug 369 will be brought into contact with the member 370, which will turn the dog 367 in a counter-clockwise direction about its pivot 368 against the action of the spring 369ᵃ, and this results in moving the tail 366 of the dog 365 in a clockwise direction so as to throw this dog out of engagement with the teeth on the disk 362. At the same time, the tail 412 of the dog 410 comes into contact with the shaft 148, which throws this dog in a counter-clockwise direction and disengages its lug 414 from the teeth of the disk 362. At the end of the complete revolution of the disk 363, the catch 374 engages behind the shoulder 375 to prevent reverse motion of the disk. Thus the disk is held in stationary position, reverse movement being prevented by the member 374 and forward movement being prevented by the member 370. The disk 363 remains in its normal stationary position until the actuating member 380 is once more depressed to raise the member 370 and start one more complete revolution of the driving disk 363.

Mechanism is provided for breaking the connection between the actuating member 380 and the member 370 during the cycle of operation, so that in case the operator should inadvertently keep the member 380 depressed, the clutch would nevertheless be opened at the end of one complete revolution, to prevent the machine from continuing to operate while the member 380 remains depressed. This means for breaking the connection is best shown in Figs. 5 and 14. An arm 430 is fixed to a sleeve 431 rotatable on the shaft 361 and connected to the disk 363 and the gears 420 and 422 to rotate as a unit therewith. This arm 430 carries a pin 432 in the plane of the lower arm 433 of the bell crank 401. When the clutch is open and the parts are in normal stationary position, the arm 430 is in the position shown in Fig. 14. When the clutch is closed, during the single revolution of the disk 363 and the sleeve 431, and long before the end of the revolution, the pin 432 on the arm 430, moving in a clockwise direction, contacts with the arm 433 of the bell crank 401 and moves the latter in a counter-clockwise direction about its pivot. This results in depressing the pin 400 on the bell crank from the position shown in Fig. 14 so that the forward end of the link 398 is carried downwardly until the pin 403 thereon passes below the bottom of the arm 404. Thus, even though the operator continues to depress the actuating member 380 which holds the link 398 rearwardly, nevertheless the arm 404 is disconnected from the pin 403 and this allows the shaft 371 to move in a counter-clockwise direction under the influence of the spring 372 (Fig. 4) so that the member 370 can return to its initial position ready to engage the ear 369 of the dog 367 at the completion of one revolution. The pin 435 (Fig. 14) mounted on the casing engages the front of the arm 404 and limits the motion of this arm and of the shaft 371 under the influence of the spring 372.

*Ribbon mechanism*

Referring now to Fig. 14, at the front end of the lower casing portion 50 is a detachable casing section 450 held in place partly by engagement with the cross rod 451 and partly by the upper edge 452 of the detachable section being engaged by the upper casing 51 when the latter is in normal closed position. When the upper casing 51 is opened up, the casing section 450 may be removed to obtain access to a ribbon spool 453, the trunnions 454 of which are mounted in a pair of slotted brackets 455. The ribbon 150 passes rearwardly from this spool over a guiding or supporting plate 456 mounted on the lower casing in a plane slightly above the paper guides 170 and 172, so that when the paper is fed into the machine it is beneath the guiding plate 456 and consequently beneath the upper stretch 150a of the ribbon which passes over the guiding plate. On each side of the printing line and closely adjacent thereto, stripping plates 457 are mounted on the guide plate 456, which stripping plates are resilient and strip the paper from the roughened or corrugated type members after each printing operation if the paper tends to stick thereto notwithstanding the interposition of the ribbon between the paper and type. The ribbon passes between these stripping plates and the type members and thence continues rearwardly over the guide plate 456, riding preferably on ridges 458 (Fig. 14) formed in the plate 456 at intervals so that the ribbon is kept out of contact with the major area of the plate.

The ribbon passes around a roller 459 near the rear of the machine and thence extends forwardly again beneath the top plate 460 of the lower casing portion 50. This lower stretch of the ribbon is indicated at 150b in Fig. 18, and the ribbon here passes between the platen and the sheet material, so as to print on the under side of the sheet. The ribbon then continues forwardly above a guide plate 461 and is wound on a rewinding spool 462 the trunnions 463 of which may be inserted in or removed from a pair of L-shaped slots 464, best shown in Fig. 14. When the trunnions have been placed in the bottoms of these slots, they are held in place by bell crank levers 465 normally maintained in the position shown in Fig. 14 by springs 466. The tails 467 of these levers may be moved forwardly, however, to shift the levers out of contact with the trunnions 463, so that the latter may be moved out of the slot 464 to replace the spool 462. This is done, of course, when the upper casing 51 is opened.

The ribbon is moved through a slight distance during each cycle of operation of the machine in order that fresh portions of the ribbon may be moved to the printing line to replace used portions. This feeding of the ribbon is accomplished by the pin 432 on the arm 430 which rotates once during each cycle of operation, as previously described. As the pin 432 moves, it contacts with a nose 470 on a lever pivoted at 471 to the casing, which lever has another arm 472 pivoted to a link 473 the other end of which is connected to a lever 474 pivoted to the casing at 475. A spring 476 tends to draw the link 473 rearwardly and holds the portion 472 of the lever against a stop member 476. When the pin 432 contacts with the nose 470, however, it moves the nose in a counter-clockwise direction against the action of the spring 476 and shoves the link 473 forwardly to move the arm 474 in a counter-clockwise direction.

This movement of the arm 474 carries forwardly a feeding dog 477 pivoted at 478 to the arm 474 and maintained by a spring 479 in contact with a ratchet 480. (See also Fig. 15.) This ratchet has attached thereto a pinion 481 meshing with a gear 482 fixed to the rewinding spool 462. Thus during each cycle of operation, the feeding dog 477 will rotate the ratchet 480 slightly, which will turn the pinion 481 and turn the gear 482 to operate the rewinding spool 462. The extent of movement of the ribbon at each actuation may be varied by varying the sizes of the pinion 481 and gear 482.

A dog 485 (Fig. 14) is held in engagement with the ratchet 480 by a spring 486, so as to maintain the ratchet in the position to which it is advanced by the dog 477 and prevent retrograde motion thereof.

If it is desired to print only on the top of the sheet and not on the bottom, as illustrated for example in Fig. 19, the ribbon supply spool may be placed in any convenient location at the rear of the machine and the ribbon may be led forwardly over the guide plate 456 and thence to the rewinding spool 462.

The ribbon employed preferably has different color zones, so that the prefix is printed in one color and the amount in a different color. At present it is preferred to use a ribbon of five zones, a black zone for printing the prefix, a red zone for the dollars of the amount, a black zone for the "And", another red zone for the cents of the amount, and another black zone for the "Cts."

In order that the ribbon may be properly adjusted to bring the various color zones thereof accurately into registration with the proper printing types, the ribbon guide 456 above mentioned is made adjustable in a direction transversely of the color zones. The forward end of the guide 456, as shown in Figs. 3 and 16, is received in a recess or notch in the upper edge of a bar 490, one end of which is slotted and supported on a pin 491, while the other end is threaded on and supported by a thumb screw 492 which may be turned to cause the bar 490 to move longitudinally and thus to adjust the ribbon guide 456 transversely. A similar adjustment may be provided if desired for the rear end of the ribbon guide, though ordinarily the adjustment at the front end alone is sufficient.

*Summary of operation*

A detailed description of the operation of each part of the mechanism has already been given, and it will now suffice to review briefly the operation of the machine as a whole.

Assuming that the motor 351 is running so that the belt 160 is constantly driven, and assuming that the cam assembly shown in Fig. 21 is set in its normal position, the operator sets the finger pieces 73 to move the type members 66 selectively to printing position to print any desired amount. For example, in the setting shown in Fig. 1 of the drawings, the type members have been set to print 648.35, which is the amount shown printed on the check illustrated in Fig. 23.

The operator now places the sheet material such as a check or draft in the paper guides 170 and 172 at the right hand end thereof and moves the sheet leftwardly so that the advancing or left hand end thereof rides under the roller 181. The operator may then let go of the sheet, and the roller 181 holds it in contact with the feeding belt 160 with sufficient force so that the sheet is fed leftwardly into printing position and comes to rest against the first paper stop 201, notwithstanding the continued motion of the feeding belt.

The operator may set up the amount by moving the finger pieces 73 at this time if desired, rather than before the sheet is fed into the machine, as it is immaterial at what time the finger pieces are set so long as it be before the depression of the actuating member 380.

The actuating member is now depressed, which raises the member 370 and allows the dog 367 to close the clutch to connect the disk 363 with the constantly rotating toothed disk 362. This disk 363 will then rotate through one complete revolution and come to a stop exactly at the end of a revolution.

During this revolution of the disk, the platen cam shaft 148 is rotated through two complete revolutions and the cam shaft 212 is rotated through one complete revolution.

At the beginning of the cycle of operation, the alining bar 85 is brought downwardly into one or another of the notches 96 on the printing members 65, to aline the printing members 66 accurately. Then the platens 131 and 132 are moved upwardly to effect printing, this movement being almost simultaneous but with the platen 131 slightly in advance of the platen 132, so as to distribute the strain of printing somewhat instead of having it fall entirely at one point. The upward movement of the platen 131 prints the word "And" between the dollars and cents and the figures representing the cents and also the letters "Cts" after the cents. The platen 132 prints the dollars, which may be of variable length from one denomination up to the maximum capacity of the machine, which is six denominations of dollars in the embodiment illustrated. These characters are printed through a multicolored ribbon divided into five color zones, so that the dollars are printed in red, the word "And" in black, the cents in red, and the letters "Cts" in black; the fifth zone is a black zone used for printing the prefix, which is the next operation.

During or slightly before the printing of the amount by the actuation of the platens 131 and 132, the cam 255 has released the lever 257 so that the spring 253 has positioned the feeler 226 against the highest denomination printing member which has been moved from an ineffective non-print position to an effective printing position. Fig. 10 illustrates this feeler moved to a position against the hundreds of dollars printing member, as would be the case when only three denominations of dollars were being used. This movement of the feeler has shifted the stops 215 and 285 from their normal position such as illustrated in Fig. 5 to another position such as shown in Fig. 10, the movement being in accordance with the length of the amount as previously explained.

During the printing of the amount by the actuation of the platens 131 and 132, the paper stop 201 is withdrawn by its control cam 211, since at this time the paper is held against movement by the pressure of the platens and the stop is not needed. The control cam 273 at this time allows the second paper stop 215 to be raised by its spring 302, and as soon as the paper is released by the depression of the platens 131 and 132, it again moves leftwardly under the influence of the belt 160 until it comes into contact with the stop 215 and is held stationary thereby. Thus the paper has moved from the printing of the amount to its next printing position through a distance which is a function of the length of the amount, because the stop 215 has been positioned by the feeler 226.

Immediately after the completion of the printing by the platen 132, the cam 127 on the shaft 212 shifts the bar 118 and prefix carrier 115 from the position shown in Fig. 6 to that shown in Fig. 7, to bring the first prefix printing type 116 into printing position. Then, while the paper is held stationary by the stop 215, the cam 147 on the shaft 148 raises the platen 133 to effect printing of the prefix through a black zone of the ribbon. Because the paper has been moved between the amount printing and the prefix printing through a distance which is a function of the length of the amount, it follows that the prefix will be printed in predetermined position relative to the amount and closely adjacent thereto irrespective of the length of the amount. For instance, if the amount were of four or five denominations of dollars instead of three denominations as illustrated in Fig. 23, the dollar mark of the prefix would nevertheless be printed in the same position relative to the first figure of the amount as is shown in Fig. 23.

The printing of the prefix completes the first half of the cycle of operation, and the platen cam shaft 148 has now moved through one complete revolution while the driving disk 363 and the cam shaft 212 have each moved through half of a complete revolution. At or slightly before the beginning of the second half of the cycle, the stop 215 is withdrawn and the stop 275 is raised, so that when the paper is released by return movement of the platen 133, it moves leftwardly under the influence of the feeding belt 160 until it comes into contact with the stop 275 and is held stationary thereby. The platens 131 and 132 are now operated once more during the second rotation of the shaft 148 to print the amount, this time near the right hand end of the sheet as illustrated in Fig. 23. Stop 275 is withdrawn at or slightly before the end of this printing and the stop 285, which remains shifted under the influence of the feeler 226, is raised to position the paper for the printing of the prefix in connection with the second printed amount. At the completion of the second printing of the amount, the cam 127 moves the prefix carrier 115 from the intermediate position to which it has been returned after the printing of the first prefix, to the position shown in Fig. 7, to bring the second prefix type 117 into printing position on the printing line. Then toward the completion of the second rotation of the shaft 148, which is toward the completion of the entire cycle of operation of the machine, the platen 133 is raised a second time to print the prefix, but this time the prefix is printed from the type 117 instead of from the type 116, and is preferably different from the first printed prefix, as in the omission of the word "Exactly".

During this printing of the second prefix, which like the first prefix is in predetermined relation to the amount irrespective of variations in the length of the latter, the stop 285 is withdrawn by its cam so that at the end of the printing the sheet may resume its movement under the influence of the feeding belt 160 and is fed leftwardly and discharged from the machine. At the end of the cycle, the cam 255 raises the lever 257 to bring the feeler 226 back to its normal position shown in Fig. 3, and the cam 108 releases the lever 106 to raise the alining bar 85 out of the notches 96 so that the printing members may be set to another position for printing another sheet.

During the cycle, the pin 432 on the arm 430 actuates the nose 470 to effect feeding of the ribbon through a slight distance, so that fresh portions of the ribbon are constantly being brought to the printing line.

In case several thicknesses of paper or an unusually thick sheet should inadvertently be fed into the machine, the load on the platen cams might be sufficient to stall the machine. If this occurs, the operator may grasp a knurled knob 500 accessible at the rear of the machine on the shaft 359, as shown in Fig. 5, and may turn this with his fingers to assist the motor in forcing the platens upwardly against the unusually thick sheet material. Should this expedient fail to clear the machine, the retaining bar 57 may be withdrawn to open the upper casing portion 51, for removing the sheet material from the apparatus.

It will be recalled from the above description that as soon as the check is deposited on the feeding belt 160, it is immediately moved leftwardly until it comes into contact with the initial stop 201. At times it may be desired, however, to hold the check near the right hand end of the feeding belt 160 in a position exteriorly of the casing so that the check may be observed by the operator, until the actual printing operation is to be performed. To this end, the mechanism shown in Figs. 24 and 25 may be provided, if desired, without altering the other features previously described.

As shown especially in Figs. 24 and 25, there is provided a downwardly extending finger 510 on the right hand side of the upper casing 51, which finger depends from and is held in position by the same screw 511 which holds the bracket 180. As shown particularly in Fig. 25, the lower end of this finger is slightly curved and terminates a relatively slight distance above the top surface of the paper guides 170 and 172 so that a sheet of paper is permitted to pass along the paper guides beneath the finger 510, but the finger prevents the paper from buckling or rising to any substantial extent above the guides.

Adjacent the finger 510, as best shown in Fig. 24, there is provided a stop member 512 pivoted to the side of the casing at 513 and having a nose 514 which, when in its effective position, is substantially in contact with the top of the paper guide 170 so that the advancing edge of a sheet deposited on the belt 160 will come into contact with the nose 514 and further movement of the sheet under the influence of the belt will be stopped. Thus the check or other sheet is held by the stop 512 in a position exteriorly of the casing so that the name of the payee or other information on the sheet may be read by the operator if desired. Just before the actual printing operation, the stop 512 may be released by any suitable means to permit the sheet to move leftwardly into the casing under the influence of the belt 160.

The means for releasing the stop 512 preferably comprises an arm 515 on the stop having a nose 516 underlying a downward extension 517 on the actuating member or trip bar 380. When the trip bar is depressed to close the clutch mechanism and to cause a printing operation, this depression of the bar automatically elevates the nose 514 of the stop member 512 and thus permits the sheet to move leftwardly until the advancing edge thereof comes into contact with the initial printing stop 201, which properly positions the sheet for the first printing operation.

While one embodiment of the invention has been disclosed, it is to be understood that the inventive idea may be carried out in a number of ways. This application is therefore not to be limited to the precise details described, but is intended to cover all variations and modifications thereof falling within the spirit of the invention or the scope of the appended claims.

We claim:

1. In a printing apparatus, the combination with means for printing matter of variable size upon sheet material, of means for printing additional matter, and mechanism for variably feeding said sheet material from one of said printing means to the other of said printing means, said feeding mechanism being controlled by said means for printing matter of variable size so as to effect proper spacing between the matter printed thereby and said additional matter.

2. In a printing apparatus, the combination with means for printing matter of variable size upon sheet material, of means for printing additional matter, and mechanism for variably feeding said sheet material from one of said printing means to the other of said printing means, said feeding mechanism including a movable stop controlled by said means for printing matter of variable length so as to effect proper spacing between the matter printed thereby and said additional matter.

3. In a printing apparatus, the combination with means for printing matter of variable size upon sheet material, of means for printing other matter upon the same sheet material, feeding mechanism to carry sheet material from a position to be printed upon by one of said printing means to a position to be printed upon by the other of said printing means, and mechanism controlled by said means for printing matter of variable size, for controlling the extent of feeding of said sheet material by said feeding means.

4. In a printing apparatus, the combination with means for printing matter of variable size upon sheet material, of means for printing other matter upon the same sheet material, feeding mechanism for said sheet material, movable stop means for holding said sheet material in printing position, and mechanism for positioning said stop means in accordance with the size of matter printed by said means for printing matter of variable size.

5. In a printing apparatus, the combination with means for printing matter of variable size upon sheet material, of means for printing other matter upon the same sheet material, feeding mechanism for said sheet material, movable stop means for holding said sheet material in printing position, and mechanism controlled by said means for printing matter of variable size, for shifting said movable stop means.

6. In a printing apparatus, the combination with means for printing matter of variable size upon sheet material, of means for printing other matter upon the same sheet material, feeding mechanism tending to move said sheet material to and beyond printing position, movable stop means for holding said sheet material in printing position, and mechanism controlled by said means for printing matter of variable size, for shifting said stop means in the direction of movement of said sheet material, so that said other matter printed on said sheet material will be in predetermined relationship to said matter of variable size notwithstanding variations in size of the latter.

7. In a printing apparatus, the combination with a frame having two portions relatively movable connected to each other at two spaced points, at least one of the connections being releasable so that said portions may be moved relatively to each other, said frame having an opening between said two portions intermediate said points of connection, of type means mounted on one of said frame portions intermediate said points of connection for printing matter of variable size along a line extending generally transverse to a line drawn between said two points, platen means mounted on the other of said frame portions for cooperation with said type means, and mechanism for feeding sheet material into said opening in a direction generally transverse to a line drawn between said two points and between said type means and said platen means, to a printing position.

8. In a printing apparatus, the combination with a frame having two portions connected to each other at two spaced points and having an opening between said two portions intermediate said points of connection, of type means mounted on one of said frame portions intermediate said points of connection for printing matter of variable size, platen means mounted on the other of said frame portions for cooperation with said type means, mechanism for feeding sheet material into said opening and between said type means and said platen means, a movable stop member for holding said sheet material, and mechanism controlled by said type means for moving said stop member in accordance with the size of matter printed by said type means.

9. In a printing apparatus, the combination with means for effecting two successive printing operations upon a piece of sheet material, said means being capable of printing matter of variable size in one of said operations, of mechanism tending to shift said sheet material between said two printing operations, and stop means automatically positioned in accordance with the size of matter printed in said one of said operations for limiting the extent of shifting of said sheet material under the influence of said shifting mechanism.

10. In a printing apparatus, the combination with means for effecting two successive printing operations upon a piece of sheet material, said means being capable of printing matter of variable size in one of said operations, of mechanism tending to shift said sheet material between said two printing operations, and stop means shiftable substantially in the direction of shifting of said sheet material and automatically positioned in accordance with the size of matter printed in said one of said operations, for limiting the extent of shifting of said sheet material under the influence of said shifting mechanism.

11. In a printing apparatus, the combination with printing means including a plurality of denominational members for printing upon sheet material, certain of said denominational members being shiftable from an inoperative non-printing position to an operative printing position, of other means for printing upon the same sheet material, and mechanism for shifting said sheet material between the printing by said denominational members and the printing by said other means through a distance determined by the positions of said shiftable denominational members.

12. In a printing apparatus, the combination with printing means including a plurality of denominational members for printing upon sheet material, certain of said denominational members being shiftable from an inoperative non-printing position to an operative printing position, of other means for printing upon the same sheet material, mechanism tending to shift said sheet material between the printing by said denominational members and the printing by said other means, and stop means for limiting the extent of shifting of said sheet material, said stop means including a member positioned in accordance with the positions of said shiftable denominational members.

13. In a printing apparatus, the combination with printing means including a plurality of denominational members for printing upon sheet material, certain of said denominational members being shiftable from an inoperative non-printing position to an operative printing position, of other means for printing upon the same sheet material, mechanism tending to shift said sheet material between the printing by said denominational members and the printing by said other means, shiftable stop means for limiting the extent of shifting of said sheet material, and a feeler cooperating with the denominational member of highest denomination which has been moved from an inoperative position to an operative position for determining the position of said shiftable stop means.

14. A checkwriter comprising a plurality of type members movable selectively to printing position for printing amounts of different lengths upon sheet material, an additional type member for printing auxiliary matter, and mechanism for variably feeding the sheet material from said amount type members to said additional type member, said feeding mechanism being controlled by said amount type members so as to effect proper spacing between the amount printed thereby and said auxiliary matter.

15. A checkwriter comprising means for printing an amount of variable length upon sheet material, means for printing a prefix upon the same sheet material, mechanism for shifting the sheet material between the printing of the amount and the printing of the prefix, and means positioned in accordance with the length of said amount for determining the extent of said shifting.

16. A checkwriter comprising a plurality of shiftable type members for printing an amount of variable length upon sheet material, means for printing a prefix upon the same sheet material, feeding mechanism for said sheet material, movable stop means for holding said sheet in printing position, and mechanism for positioning said stop means in accordance with the length of the amount printed by said type members.

17. A checkwriter comprising a plurality of shiftable type members for printing an amount of variable length upon sheet material, means for printing a prefix upon the same sheet material, feeding mechanism for said sheet material, movable stop means for holding said sheet material in printing position, and mechanism controlled by said type members for positioning said stop means in accordance with the length of the amount printed by said type members.

18. A checkwriter comprising a plurality of shiftable type members for printing an amount of variable length upon sheet material, means for printing a prefix upon the same sheet material, feeding mechanism tending to move said sheet material to and beyond printing position, movable stop means for holding said sheet material in printing position, and mechanism controlled by said type members for positioning said stop means so that the prefix printed on said sheet material will be in predetermined relationship to the amount printed thereon irrespective of variations in the length of the amount.

19. A checkwriter comprising means for printing an amount of variable length upon sheet material, means for printing a prefix upon the same sheet material, feeding mechanism constantly tending to move sheet material relative to said printing means, a stop to hold sheet material in position to be printed upon by one of said printing means, a shiftable stop to hold sheet material in position to be printed upon by the other of said printing means, mechanism controlled by said amount printing means for shifting said shiftable stop to a position dependent upon the length of the amount printed, means for operating both of said printing means in succession, and means for withdrawing both of said stops to an ineffective position in succession and in timed relation to the operation of said printing means.

20. In a checkwriter, the combination with means for printing matter of variable length in one color upon sheet material, of means for printing matter in a different color upon the same sheet material, and means for shifting the sheet material between the printing in the first mentioned color and the printing in the different color through a distance which is a function of the length of the matter printed in the first mentioned color, so that the matter printed in the different color will be in predetermined relationship to the matter printed in the first mentioned color.

21. In a printing apparatus, the combination with means for printing matter of variable length in one color upon sheet material, of means for printing matter in a different color upon the same sheet material, means for shifting the sheet material between the printing in the first mentioned color and the printing in the different color, and stop means positioned in accordance with the length of said variable length of matter for determining the extent of said shifting of said sheet material.

22. In a checkwriter, the combination with means for printing an amount of variable length in one color upon sheet material, of means for printing a prefix in a different color upon the same sheet material, and means for automatically shifting the sheet material between the printing in the one color and the printing in the different color through a variable distance which is a function of the length of the amount printed, so that the prefix will be in predetermined relationship to the amount irrespective of variations in the length of the latter.

23. In a checkwriter, the combination with means for printing an amount of variable length in one color upon sheet material, of means for printing a prefix in a different color upon the same sheet material, means for shifting the sheet material between the printing in the one color and the printing in the different color, and stop means automatically positioned in accordance with the length of said amount for determining the extent of said shifting, so that the prefix and the amount will be printed in predetermined relationship to each other irrespective of variations in the length of the amount.

24. In a printing apparatus, the combination with an inking ribbon having a plurality of different color zones, of means for printing matter of variable length through one of said color zones upon sheet material, means for printing matter through another of said color zones upon the same sheet material, and means for shifting the sheet material between the printing through one color zone and the printing through another color zone through a distance which is a function of the length of matter printed through one color zone.

25. In a printing apparatus, the combination with an inking ribbon having a plurality of different color zones, of means for printing an amount of variable length through one color zone upon sheet material, means for printing a prefix through another color zone upon the same sheet material, means tending to shift the sheet material between the printing through one color zone and the printing through another color zone, and movable stop means positioned in accordance with the length of said amount for limiting the shifting of said sheet material.

26. In a checkwriter, the combination with an inking ribbon having a plurality of different color zones, of means for effecting a printing operation to print through one of said zones upon sheet material, means for effecting another printing operation to print through another of said zones upon the same sheet material, one of said means being capable of printing matter of variable length, and means for effecting between said printing operations a shifting movement of the ribbon and sheet material relative to each other in a direction across said color zones through a distance which is a function of the length of matter printed through one of said color zones.

27. In a printing apparatus, the combination with printing means including a plurality of denominational members for printing in one color upon sheet material, certain of said denominational members being shiftable from an inoperative non-printing position to an operative printing position to form a printing line of variable length, of means for printing in another color upon the same sheet material, and mechanism for shifting said sheet material between the printing in one color and the printing in the other color through a distance determined by the positions of said shiftable denominationl members.

28. In a printing apparatus, the combination with printing means including a plurality of denominational members for printing in one color upon sheet material, certain of said denominational members being shiftable from an inoperative non-printing position to an operative printing position, of means for printing in another color upon the same sheet material, mechanism tending to shift said sheet material between the printing in one color and the printing in the other color, and stop means for limiting the extent of shifting of said sheet material, said stop means including a member positioned in accordance with the positions of said shiftable denominational members.

29. In a printing apparatus, the combination with printing means including a plurality of denominational members for printing in one color upon sheet material, certain of said denominational members being shiftable from an inoperative non-printing position to an operative printing position, of means for printing in another color upon the same sheet material, mechanism tending to shift said sheet material between the printing in one color and the printing in the other color, shiftable stop means for limiting the extent of shifting of said sheet material, and a feeler cooperating with the denominational member of highest denomination which has been moved from an inoperative position to an operative position for determining the position of said shiftable stop means.

30. A checkwriter comprising means for effecting two successive printing operations in different colors upon a piece of sheet material, one of said operations printing matter of variable length, and mechanism for shifting the sheet material between the two printing operations through a distance which is an inverse function of the length of the matter printed in said one of said printing operations.

31. A checkwriter comprising an inking ribbon having two different color zones, means for effecting two successive printing operations, one through each of said color zones, upon a piece of sheet material, one of said printing operations being capable of printing matter of variable size, and mechanism for shifting the sheet material between the two printing operations through a distance which is an inverse function of the size of the matter printed in said one of said printing operations, so that the matter printed in one operation will be in predetermined relationship to the matter printed in the other operation irrespective of variations in size of matter printed in one operation.

32. In a checkwriter, the combination with means for printing an amount, of means including shiftable type for printing a prefix, mechanism for actuating said printing means to print twice upon a piece of sheet material, and means for shifting said shiftable type between the two printing actuations so that the prefix printed during the second actuation is different from the prefix printed during the first actuation.

33. In a checkwriter, the combination with means for printing an amount, of means including shiftable type for printing a prefix, mechanism for actuating said printing means to print an amount and an associated prefix twice upon a piece of sheet material, and means for shifting said shiftable type between the first printing of the prefix and the second printing of the prefix so that the prefix printed in association with the first printed amount is different from the prefix printed in association with the second printed amount.

34. In a checkwriter, the combination with type means for printing an amount, of a member movable in a direction generally transverse to an amount printed by said type means, and a plurality of prefix types mounted on said member and movable therewith so that by movement of said member any one of said prefix types may be brought into position to print in association with an amount printed by said type means.

35. A checkwriter comprising means tending to move sheet material, a plurality of type bars selectively shiftable in a direction generally transverse to the direction of movement of the sheet material to set up a desired amount in printing position, a platen, movable stop means, and operating mechanism effective to cause said stop means to hold said sheet material in a first printing position and to bring said type bars and said platen relatively toward each other to print said amount, and to cause said stop means to hold said sheet material in another printing position and to bring said type bars and said platen relatively toward each other to print said amount a second time upon the same sheet material.

36. In a printing apparatus, the combination with means for printing upon sheet material, of feeding mechanism for said sheet material, and stop means for holding said sheet material in printing position, said stop means comprising a movable stop carrying member and a plurality of stops mounted on said member for bodily movement therewith and also movable independently of each other from an effective position to an ineffective position.

37. In a printing apparatus, the combination with means for printing upon sheet material, of feeding mechanism for said sheet material, and stop means for holding said sheet material in printing position, said stop means comprising a movable stop carrying member and a plurality of stops mounted on said member for bodily movement therewith and adjustable also independently of each other along said member.

38. In a printing apparatus, the combination with means for printing upon sheet material, of feeding mechanism for said sheet material, and stop means for holding said sheet material in printing position, said stop means comprising a stop carrying member movable substantially in the direction of movement of the sheet material and a stop adjustably mounted on said member.

39. In a printing apparatus, the combination with means for printing upon sheet material, of feeding mechanism for said sheet material, and stop means for holding said sheet material in printing position, said stop means comprising a stop carrying member movable substantially in the direction of movement of the sheet material and a stop mounted on said member and adjustable longitudinally thereon and movable from an effective position to an ineffective position.

40. In a printing apparatus, the combination with means for printing matter of variable size upon sheet material, of mechanism for feeding said sheet material, a stop member for holding said sheet material against movement, and means for moving said stop member in the direction of movement of said sheet material, through a distance proportional to the size of the matter printed.

41. In a printing apparatus, the combination with printing means including denominational type members for printing upon sheet material, certain of said type members being shiftable from an ineffective non-printing position to an effective printing position so that a varying number of denominations may be printed, of a movable stop member for determining the position of sheet material, and a feeler contacting with the type member of the highest denomination which has been moved from an ineffective position to an effective position for controlling movement of said stop member.

42. In a printing apparatus, the combination with a frame having two parts pivotally connected to each other for oscillation relative to each other about an axis, of shiftable printing members mounted on one of said frame parts, a feeler mounted on said one of said parts for cooperation with said printing members, a stop member mounted on the other of said frame parts, and a connection between said feeler and said stop member to move the latter in accordance with movements of the former, said connection including a movable member in alinement with said pivotal axis.

43. In a printing apparatus, the combination with a frame having two parts pivotally connected to each other for oscillation relative to each other about an axis, of a printing member mounted on one of said frame parts on one side of said pivotal axis, a platen mounted on the other of said frame parts for cooperation with said printing member, and holding means on the opposite side of said printing member from said pivotal axis for retaining said two frame parts against relative oscillation, said holding means comprising an aperture associated with one of said frame parts, an aperture associated with the other of said frame parts, and a cam member insertable in both of said apertures to lock the frame parts together and rotatable within said apertures to tighten the connection between said frame parts.

44. In a printing apparatus, the combination with a type member and a platen relatively movable toward and away from each other, of an inking ribbon between said type member and said platen, said ribbon having a feeding movement across said type member, the cooperating surfaces of said platen and type member being so shaped relative to each other as to exert between them greater pressure adjacent the edge of the type member from which the ribbon departs than adjacent the edge of the type member toward which the ribbon approaches.

45. In a printing apparatus, the combination with means for printing upon sheet material, of a plurality of stop members for holding sheet material in printing position, a driven shaft, and a plurality of cam members on said shaft for moving said stop members through a cycle of operation, said cam members being shiftable relative to said shaft to change the cycle of operation of said stop members.

46. In a printing apparatus, the combination with means for printing upon sheet material, of a plurality of stop members for holding sheet material in printing position, a driven shaft, and a plurality of cam members on said shaft for moving said stop members through a cycle of operation, said cam members being rotatable together as a unit relative to said shaft to change the cycle of operation of said stop members.

47. In a printing apparatus, the combination with type means for printing upon sheet material, of platen means movable into cooperation with said type means to effect printing, means for feeding sheet material between said type means and said platen means, a plurality of stops for holding sheet material in printing position, operating mechanism including a shaft rotatable in predetermined relationship to movement of said platen means, a plurality of cams on said shaft to operate said stops through a predetermined cycle, and means for retaining said cams in either one of a plurality of positions on said shaft, said cams being shiftable from one of said positions to another of said positions to vary the relationship between the cycle of said stops and the movements of said platen means.

48. In a printing apparatus, the combination with a casing, of printing means within said casing, feeding mechanism tending to move sheet material from a point exteriorly of said casing into said casing to be printed upon by said printing means, driving mechanism for operating said printing means, means for operatively connecting said driving mechanism to said printing means to cause operation thereof, and means under the control of said connecting means for holding sheet material exteriorly of said casing so that it may be observed, operation of said connecting means being effective to release said holding means to permit such sheet material to be moved into said casing by said feeding mechanism.

49. The method of printing checks and the like which comprises effecting two printing operations in different colors upon a check or the like, one of said operations printing an amount of variable length in one color and the other of said operations printing a prefix in another color, and shifting the check or the like between said two printing operations through a distance which is a function of the length of the amount printed, so that the amount and the prefix will be printed in predetermined relationship to each other notwithstanding variations in the length of the amount.

LIBANUS M. TODD.
WALTER B. PAYNE.